(12) United States Patent
Aiko

(10) Patent No.: US 11,385,843 B2
(45) Date of Patent: Jul. 12, 2022

(54) IMAGE FORMING APPARATUS

(71) Applicant: CANON KABUSHIKI KAISHA, Tokyo (JP)

(72) Inventor: Yasuyuki Aiko, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/168,255

(22) Filed: Feb. 5, 2021

(65) Prior Publication Data

US 2021/0263690 A1    Aug. 26, 2021

(30) Foreign Application Priority Data

Feb. 21, 2020   (JP) .............................. JP2020-028665

(51) Int. Cl.
*G06F 3/12*      (2006.01)

(52) U.S. Cl.
CPC .......... *G06F 3/1208* (2013.01); *G06F 3/1255* (2013.01); *G06F 3/1256* (2013.01); *G06F 3/1292* (2013.01); *G06F 3/1204* (2013.01)

(58) Field of Classification Search
CPC .... G06F 3/1208; G06F 3/1256; G06F 3/1292; G06F 3/1255; G06F 3/1204; G06F 3/1258; G06F 3/04817; G06F 3/125; G03G 15/5016; H04W 4/80; H04W 84/12
USPC ....................................................... 358/1.14
See application file for complete search history.

(56) References Cited

U.S. PATENT DOCUMENTS

| | | | |
|---|---|---|---|
| 9,426,321 B2 | 8/2016 | Sumita et al. | |
| 10,142,510 B2 | 11/2018 | Sumita et al. | |
| 10,447,870 B2 | 10/2019 | Naito | |
| 10,972,617 B2 | 4/2021 | Naito | |
| 2008/0049242 A1* | 2/2008 | Kimura | .............. H04N 1/00222 358/1.12 |
| 2013/0229690 A1 | 9/2013 | Sumita et al. | |
| 2016/0323477 A1 | 11/2016 | Sumita et al. | |
| 2017/0264758 A1 | 9/2017 | Naito | |
| 2019/0387109 A1 | 12/2019 | Naito | |

FOREIGN PATENT DOCUMENTS

| | | |
|---|---|---|
| JP | 2006-254162 A | 9/2006 |
| JP | 2007-166538 A | 6/2007 |
| JP | 2013-184296 A | 9/2013 |
| JP | 2017-162366 A | 9/2017 |
| JP | 2019-201410 A | 11/2019 |

\* cited by examiner

*Primary Examiner* — Darryl V Dottin

(74) *Attorney, Agent, or Firm* — Venable LLP

(57) ABSTRACT

An image forming apparatus includes an image forming assembly, a first interface, a second interface, a display, a discrimination processor, and a controller. When the discrimination processor discriminates that a set value of a printing condition, received from a portable terminal through the second interface is capable of being set by the image forming apparatus, the controller causes the image forming assembly to form an image under the printing condition depending on the set value. When the discrimination processor discriminates that the set value is not capable of being set by the image forming apparatus, the controller causes the display to display a message that the set value is not capable of being set by the image forming apparatus and a message of a printing condition based on another set value capable of being set instead of the set value by the image forming apparatus.

14 Claims, 15 Drawing Sheets

(a)

| DEVICE ID | MFP-A | | |
|---|---|---|---|
| PRINT CNDTN | COLOR INFO. | SHEET SIZE INFO. | STAPLING INFO. |
| SET VALUE | MONOCHROMATIC | A4/A3/B5 | STAPLING: ENABLE |

(b)

| DEVICE ID | MFP-B | | |
|---|---|---|---|
| PRINT CNDTN | COLOR INFO. | SHEET SIZE INFO. | STAPLING INFO. |
| SET VALUE | MONOCHROMATIC/COLOR | A4/B5 | STAPLING: DISABLE |

Fig. 4

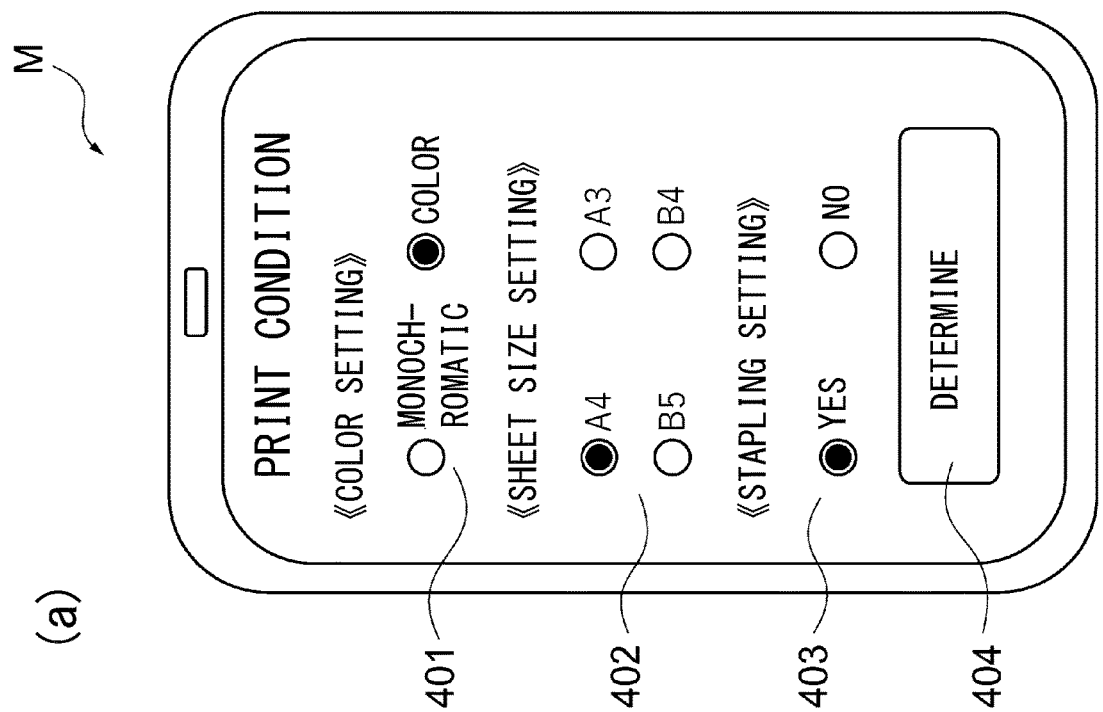
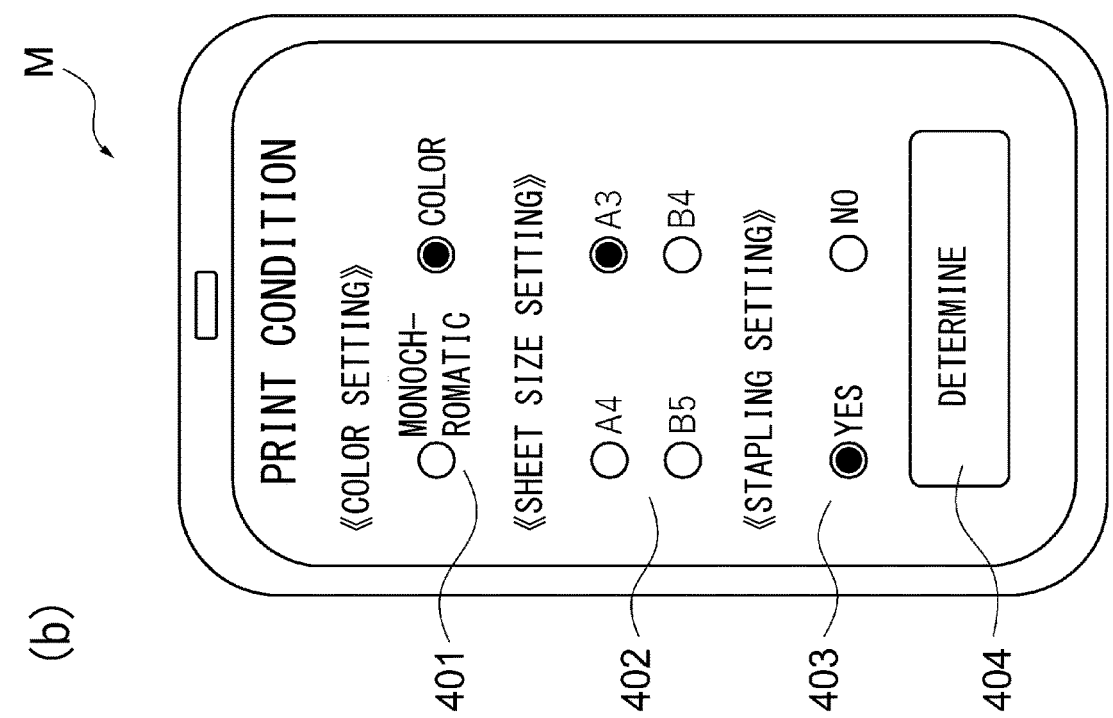
Fig. 8

IMAGE FORMING APPARATUS

FIELD OF THE INVENTION AND RELATED ART

The present invention relates to an image forming apparatus for performing a cooperative operation with an external portable terminal through wireless communication.

In recent years, a technique such that the image forming apparatus is controlled by the portable terminal by utilizing near field wireless communication such as near field communication (hereinafter referred to as NFC) has been developed.

For example, in Japanese Laid-Open Patent Application 2007-166538, a constitution in which the portable terminal transmits and receives information accessing a main communication system of the image forming apparatus through the NFC and then communicates with the image forming apparatus of the communication system to receive image data and then an image is printed has been disclosed.

In some instances, although an arbitrary printing condition (for example, color printing) is designated for the image forming apparatus from the portable terminal, the designated printing condition cannot be set in the image forming apparatus. In such a case, a constitution in which a message to that effect is displayed on a display panel or the like of the image forming apparatus has been known. A user confirmed the message on the display panel and then corrected the printing condition. However, an operation for setting a proper printing condition again is troublesome.

SUMMARY OF THE INVENTION

According to an aspect of the present invention, there is provided an image forming apparatus comprising: an image forming portion configured to form an image on a sheet; a first interface capable of transmitting and receiving a wireless signal between itself and a portable terminal; a second interface having a communication distance in which a wireless signal is capable of being transmitted and received, the communication distance being longer than a communication distance of the first interface; a display portion configured to display information on a printing condition; a discrimination processor configured to discriminate whether or not a set value of the printing condition set by the portable terminal, received from the portable terminal through the second interface is capable of being set by the image forming apparatus; and a controller configured to control the image forming portion and the display portion, wherein (1) when the discrimination processor discriminated that the set value is capable of being set, the controller causes the image forming portion to form the image under the printing condition depending on the set value, and (2) when the discrimination processor discriminated that the set value is not capable of being set, the controller causes the display portion to display a message that the set value is not capable of being set and a message of a printing condition based on another set value capable of being set instead of the set value by the image forming apparatus.

Further features of the present invention will become apparent from the following description of exemplary embodiments with reference to the attached drawings.

Parts (a) and (b) of FIG. 4 are tables of pieces of apparatus information of the image forming apparatus.

Figure 5:
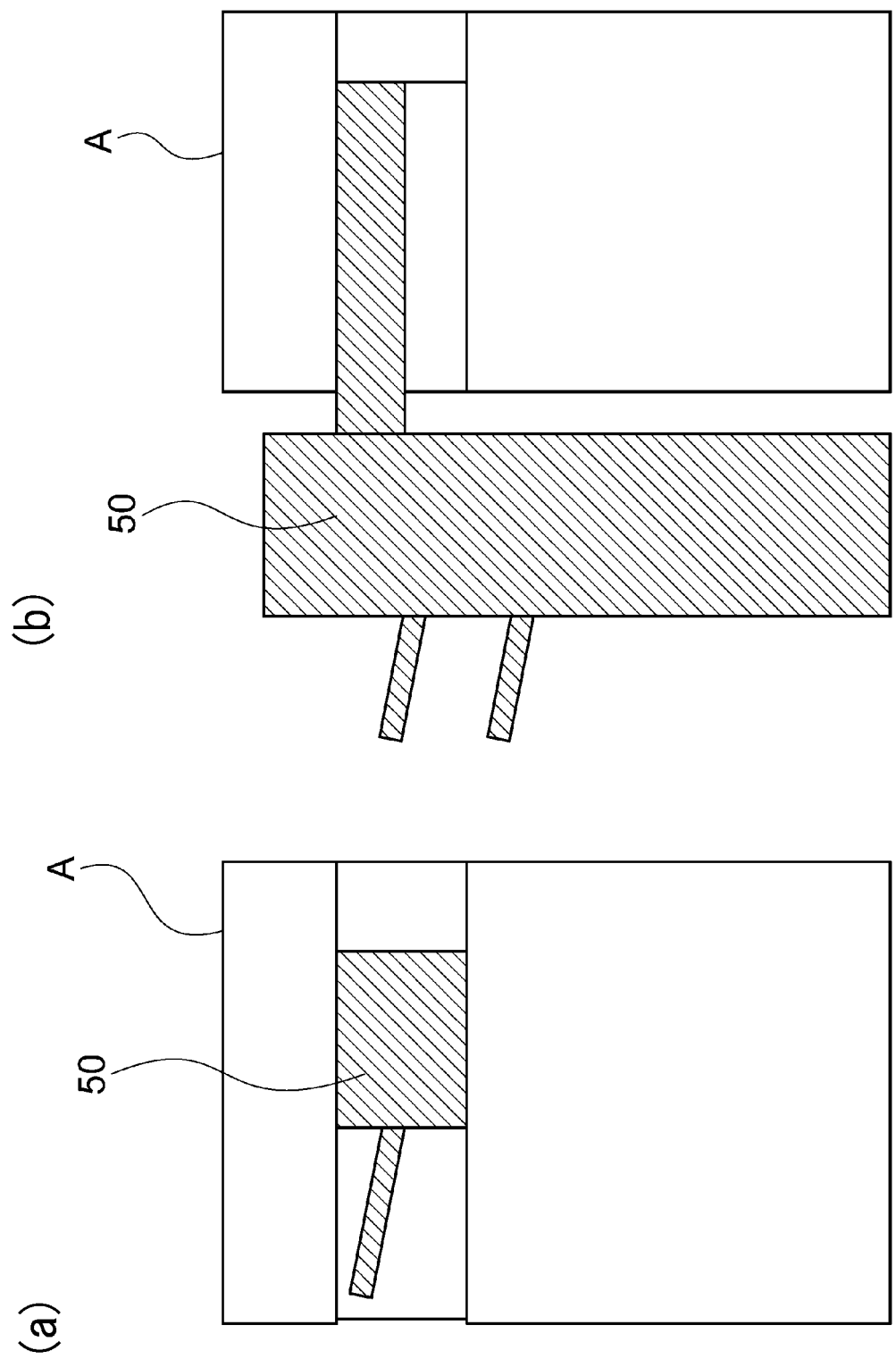

Parts (a) and (b) of FIG. 5 are schematic views each showing an image forming apparatus to which a sheet processing device is connected.

Figure 6:
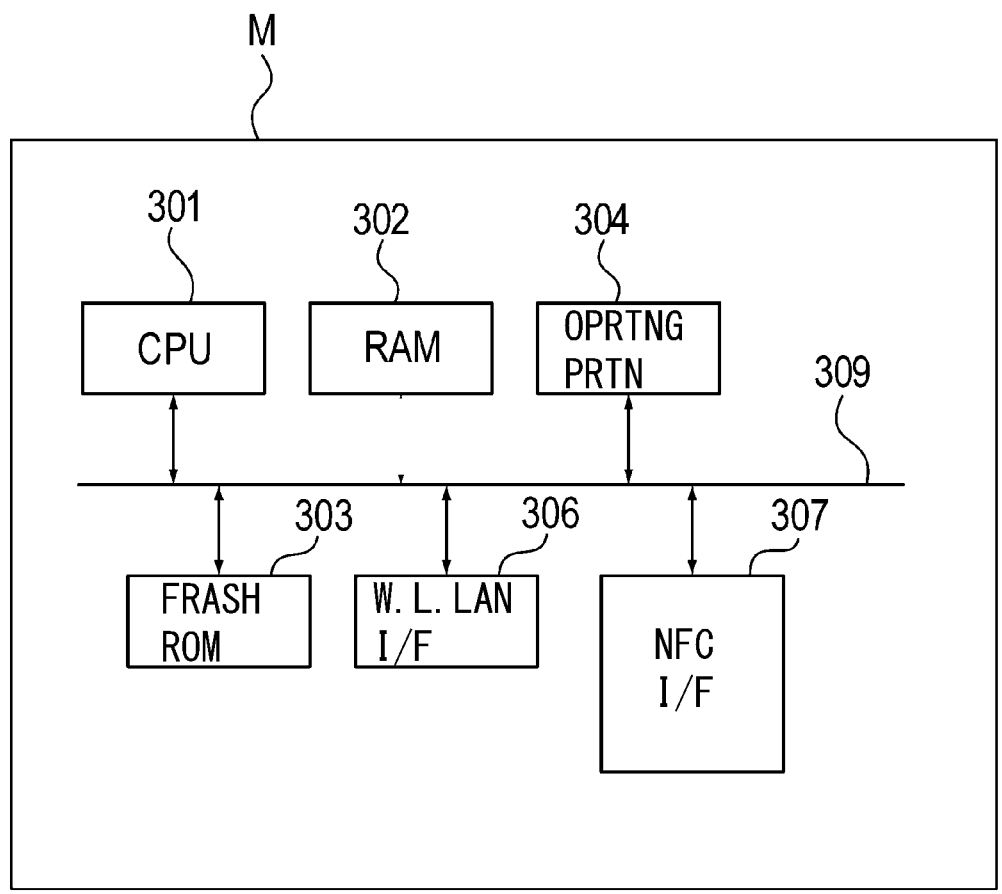

FIG. 6 is a block diagram showing a constitution of the portable terminal.

Figure 7:
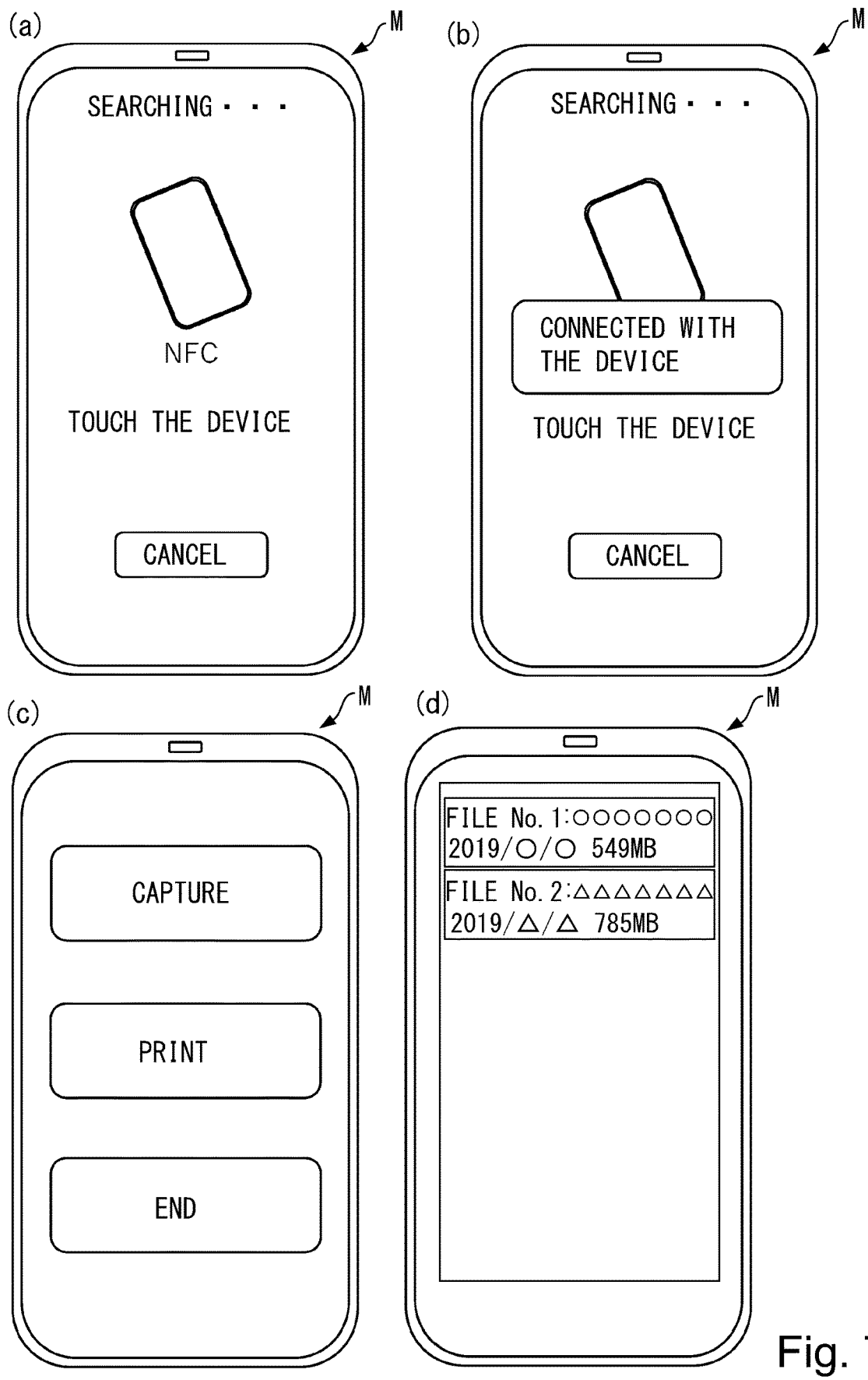

Parts (a) to (d) of FIG. 7 are schematic views each showing a display mode (screen) of the portable terminal.

Parts (a) and (b) of FIG. 8 are schematic views each showing a display mode (screen) of the portable terminal.

Figure 9:
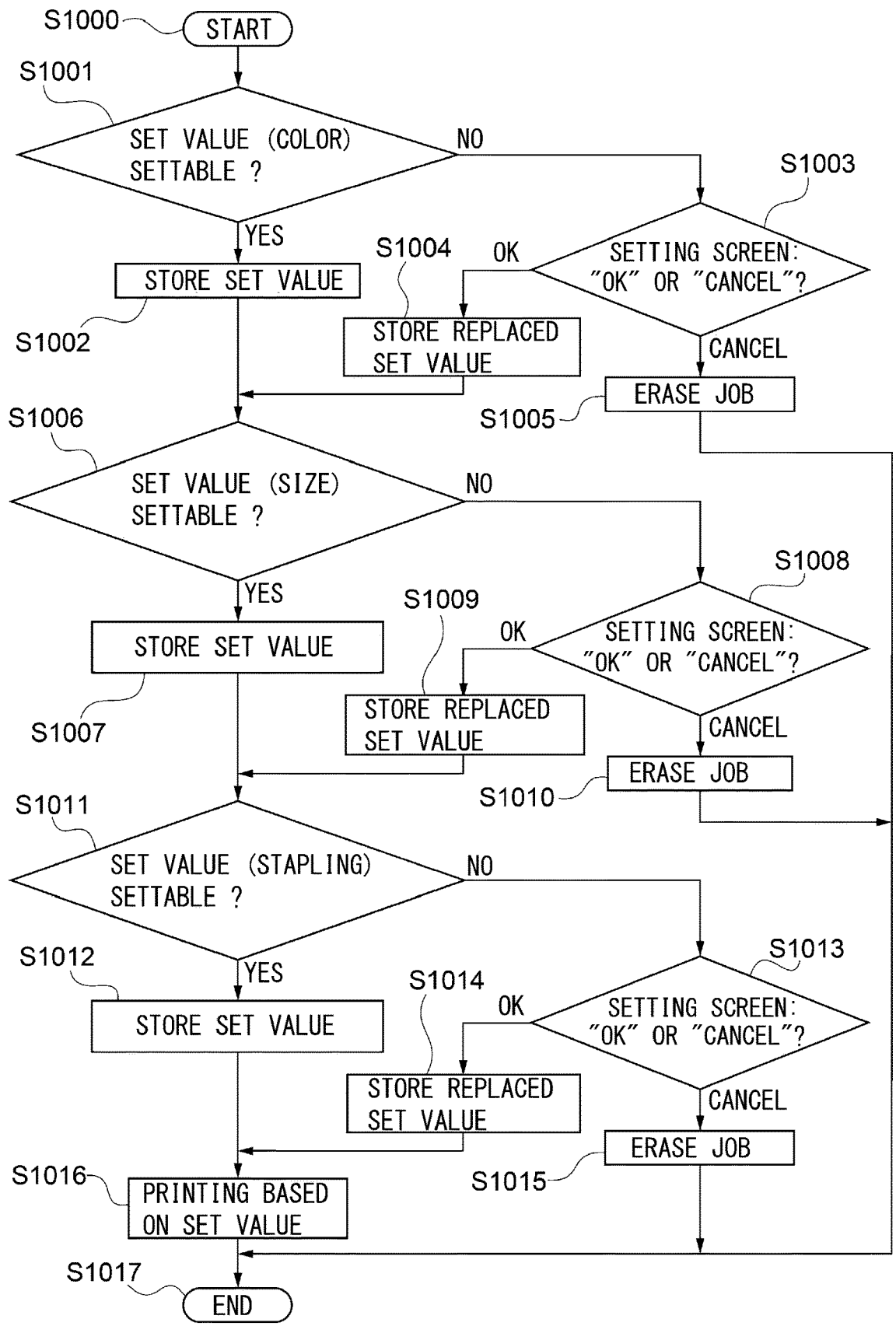

FIG. 9 is a flowchart showing control of the image forming apparatus in an embodiment 1.

Figure 10:
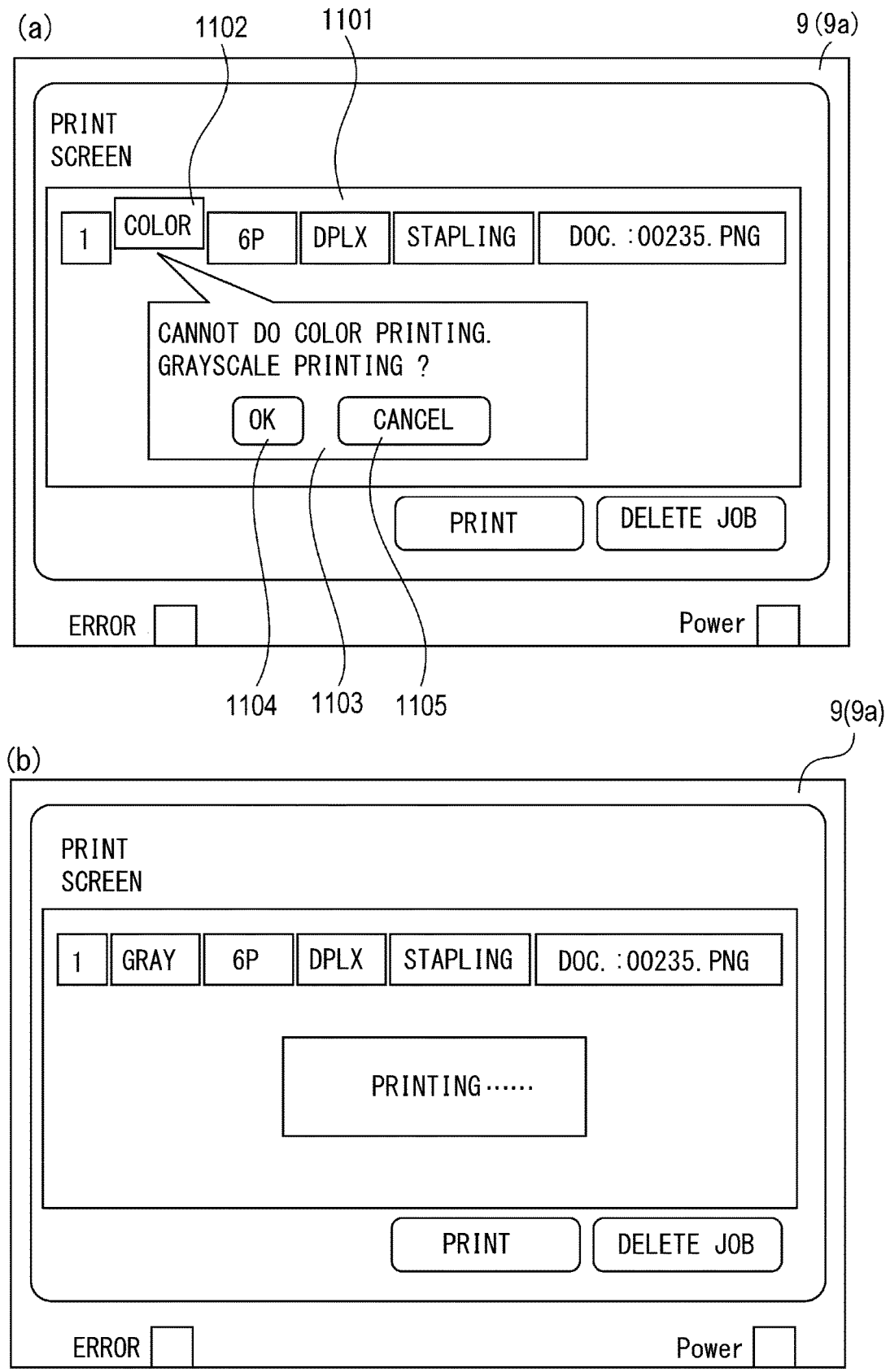

Parts (a) and (b) of FIG. 10 are schematic views each showing a display mode (screen) of the image forming apparatus in the embodiment 1.

Figure 11:
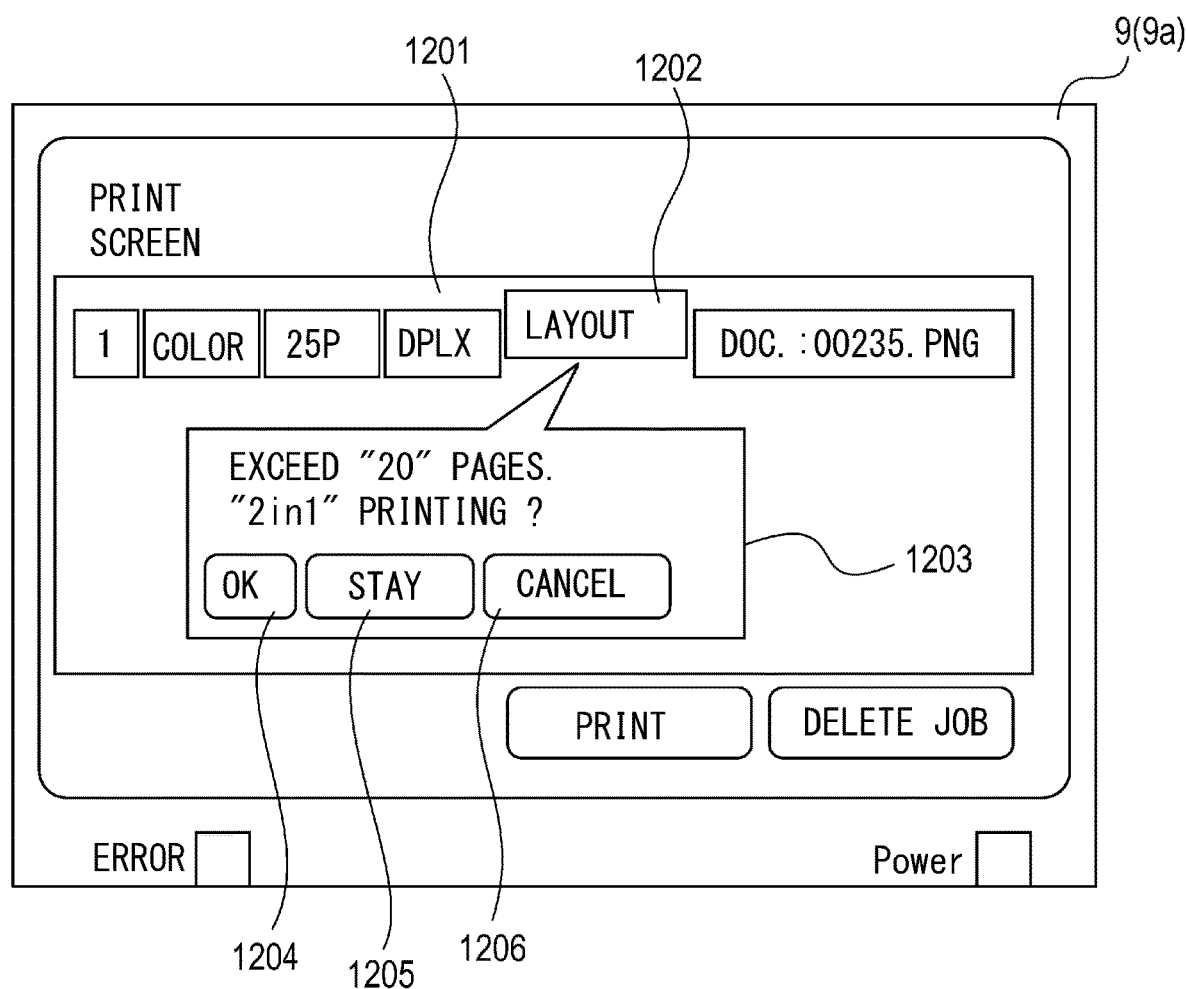

FIG. 11 is a schematic view showing a display mode (screen) of an image forming apparatus in an embodiment 2.

Figure 12:
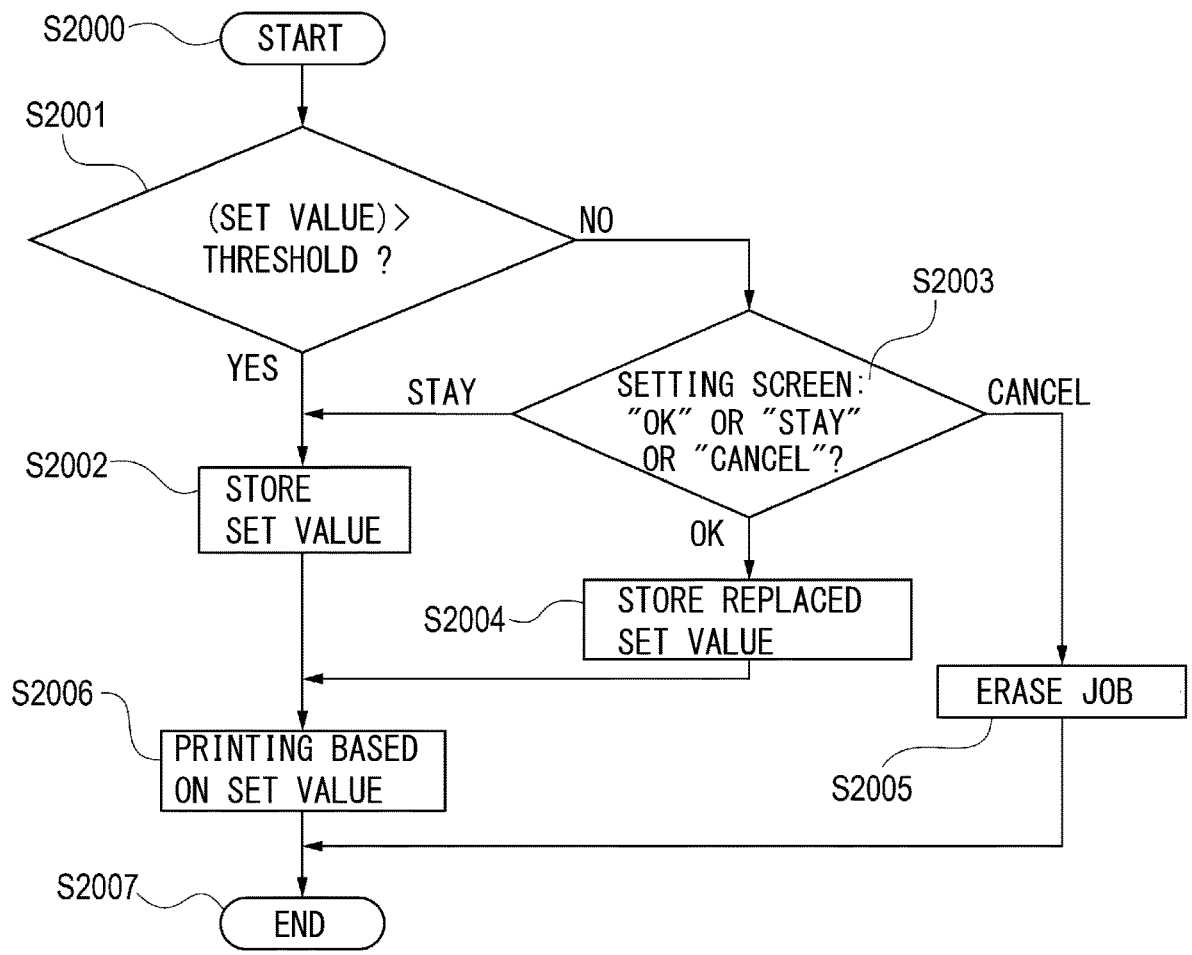

FIG. 12 is a flowchart showing control of the image forming apparatus in the embodiment 2.

Figure 13:
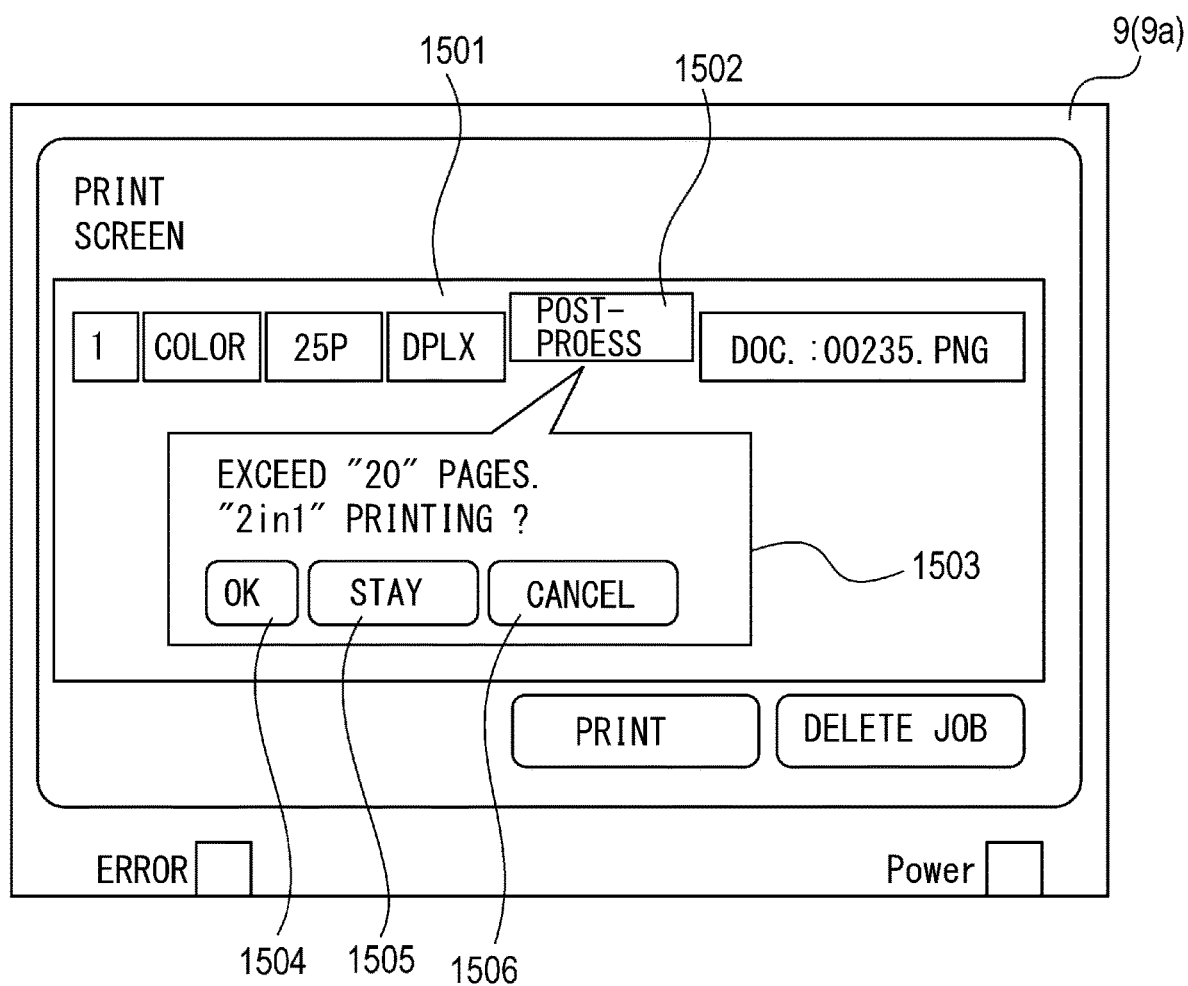

FIG. 13 is a schematic view showing a display mode (screen) of an image forming apparatus in an embodiment 3.

Figure 14:
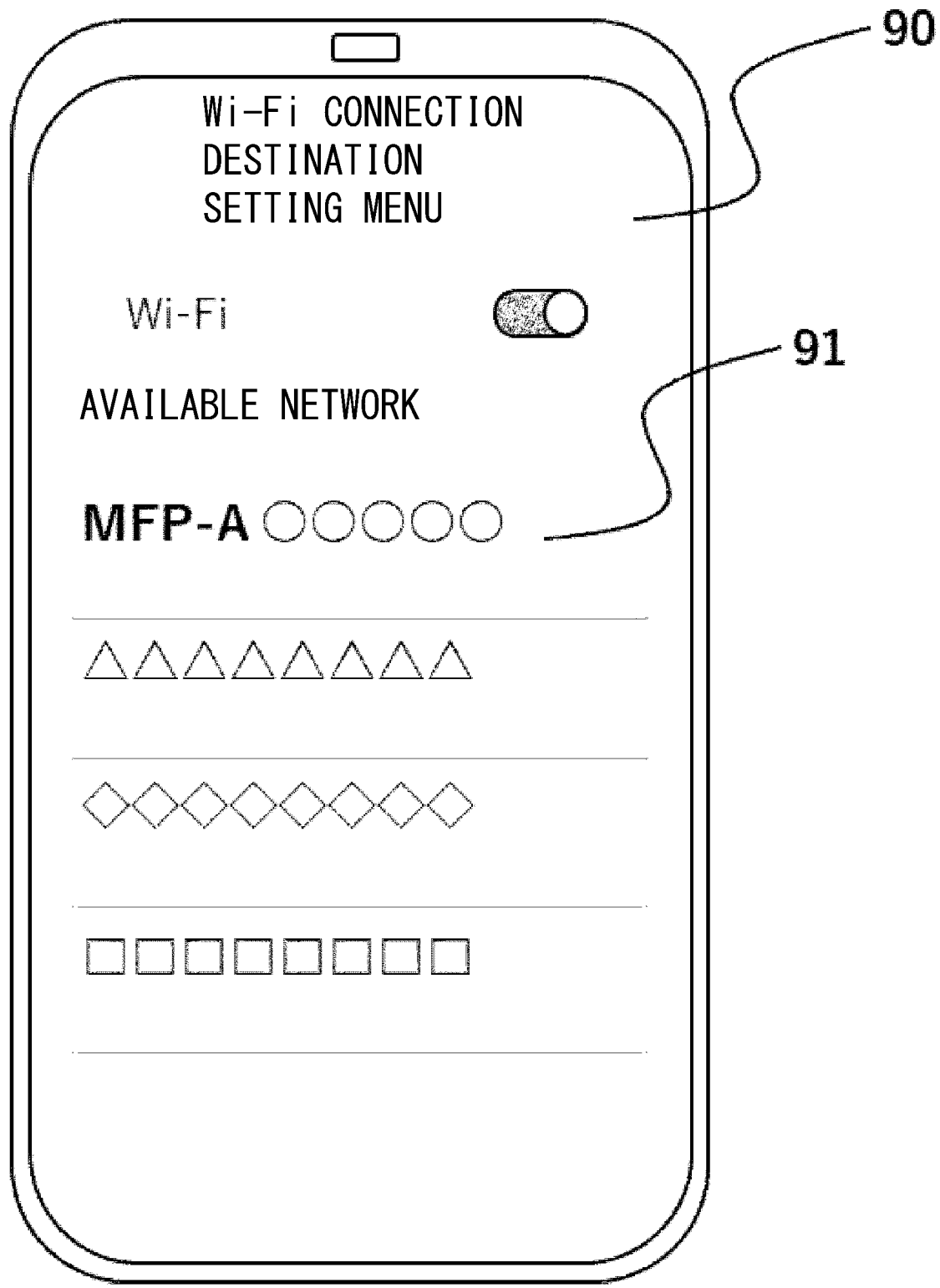

FIG. 14 is a schematic view showing a screen for setting a destination of Wi-Fi connection in the portable terminal.

Figure 15:
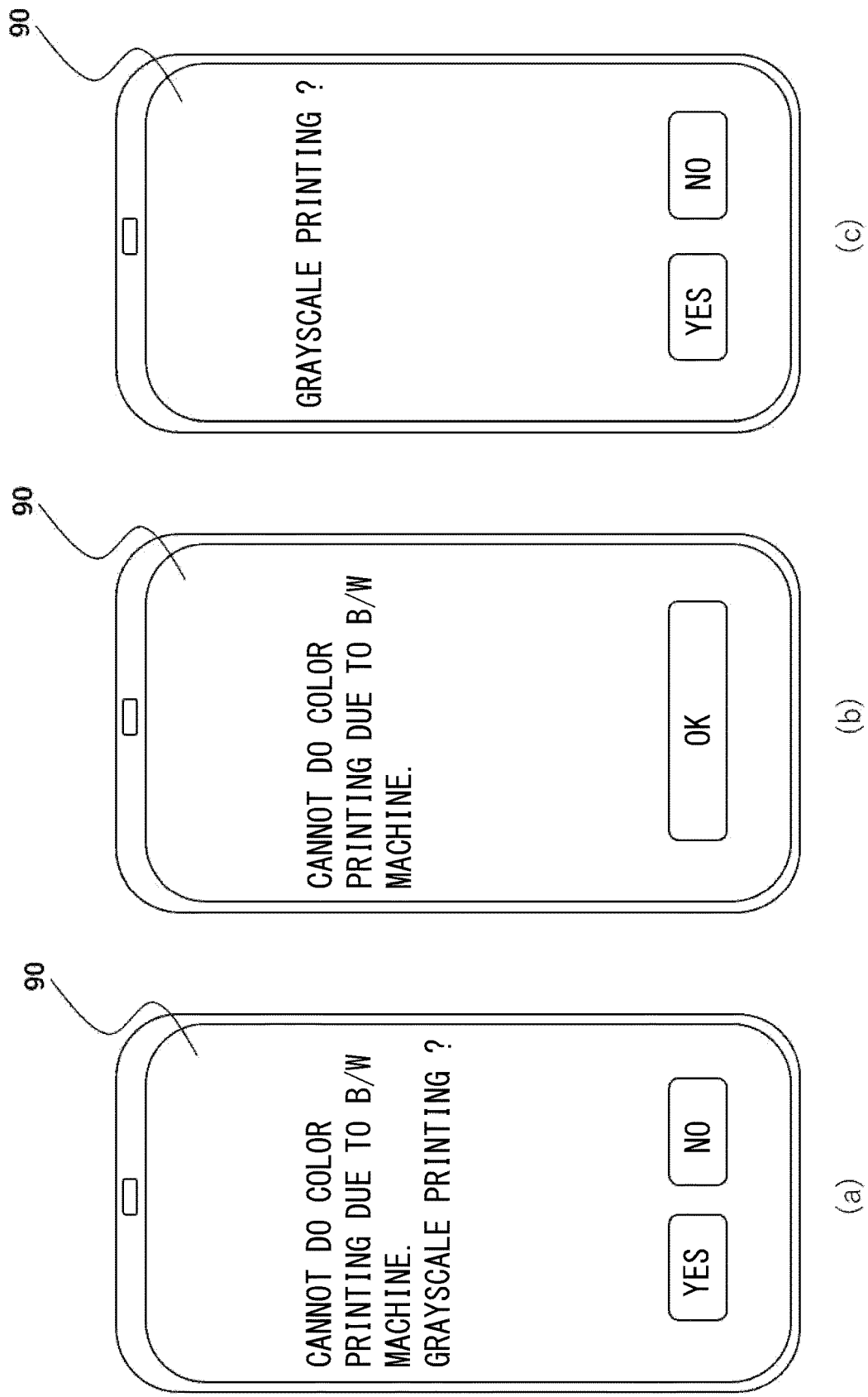

Parts (a), (b) and (c) of FIG. 15 are schematic views each showing a display mode (screen) of the portable terminal communicating with an image forming apparatus in an embodiment 4.

DESCRIPTION OF THE EMBODIMENTS

Embodiments of the present invention will be specifically described with reference to the drawings. Dimensions, materials, shapes and relative arrangement of constituent elements described in the following embodiments should be appropriately be changed depending on structures and various conditions of image forming apparatus to which the present invention is applied, and the scope of the present invention is not intended to be limited thereto.

Embodiment 1

Figure 1:
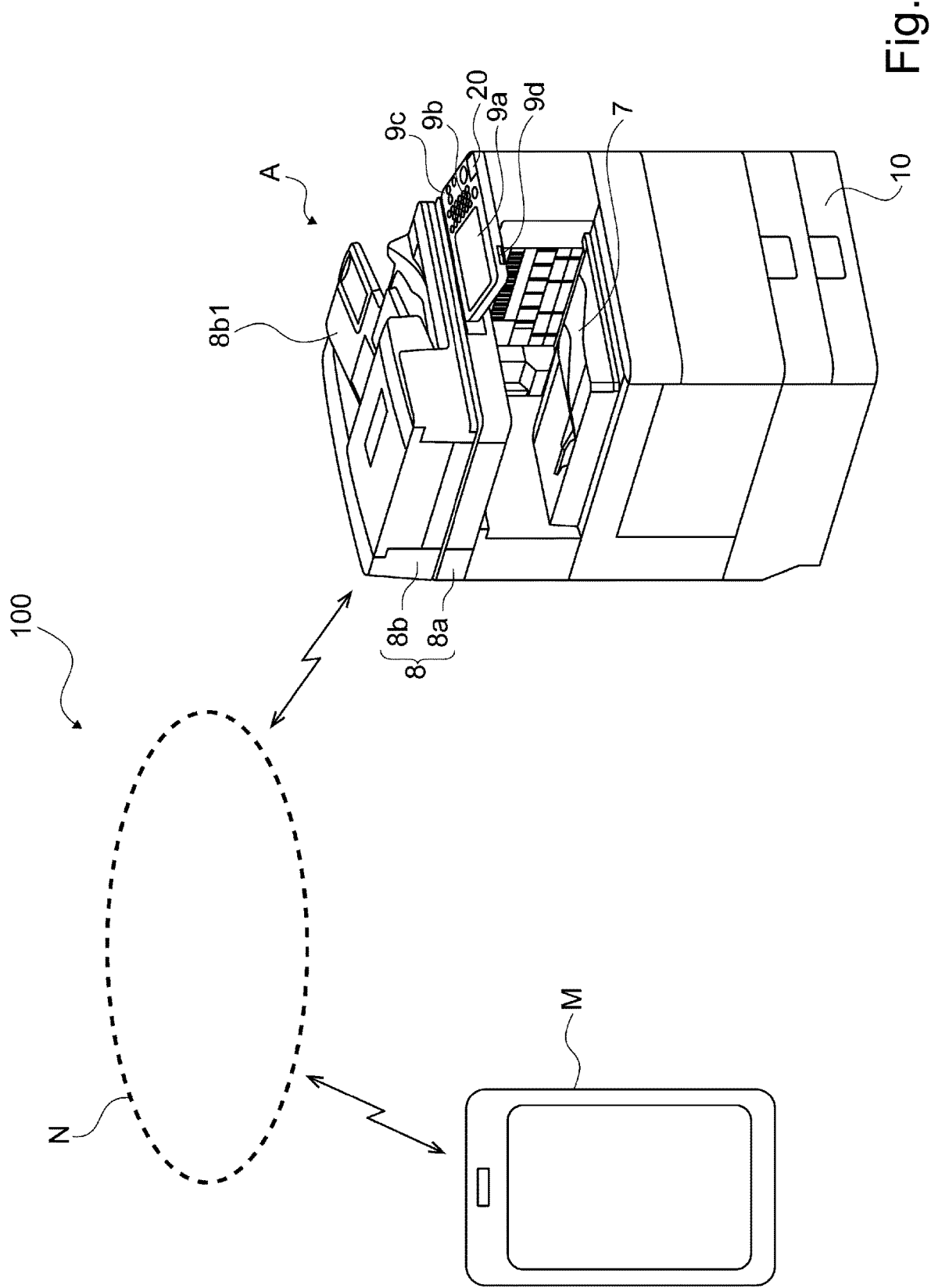
FIG. 1 is a schematic view of a system constituted by an image forming apparatus and a portable terminal.

FIG. 1 is a schematic view of a system 100 according to an embodiment 1. The system 100 shown in FIG. 1 is constituted by an image forming apparatus A and a portable terminal M. The image forming apparatus A and the portable terminal M are constituted so as to be communicatable with each other through a communication network N. The communication network may be, for example, a wired LAN (Local Area Network), a wireless LAN or a combination of these networks.

<Image Forming Apparatus>

Figure 2:
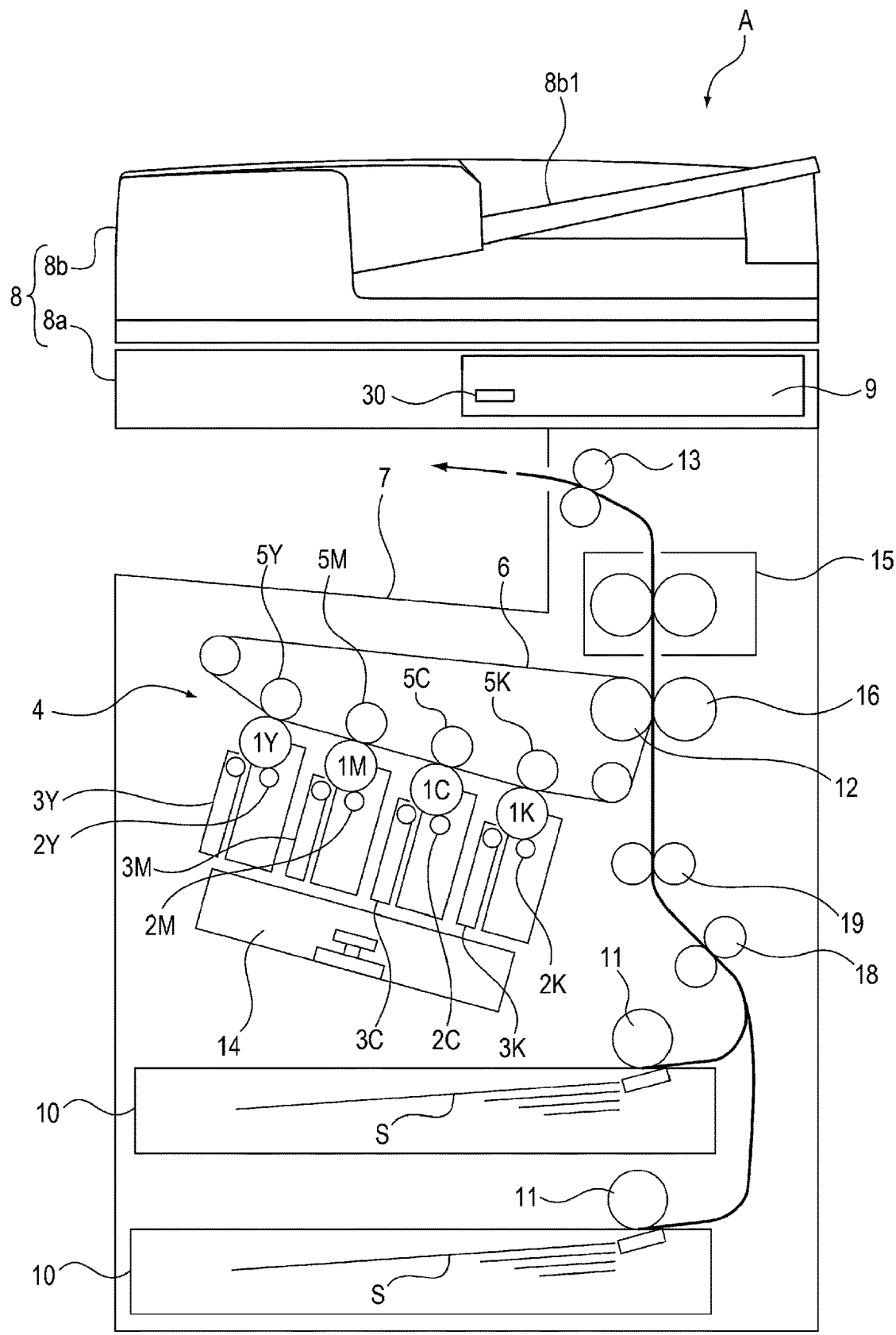
FIG. 2 is a schematic sectional view of the image forming apparatus.

FIG. 2 is a schematic sectional view of the image forming apparatus A according to this embodiment. As shown in FIGS. 1 and 2, the image forming apparatus A includes an image forming unit 4 for forming an image on a sheet (paper) S as a sheet on which the image is to be recorded. The image forming unit 4 (an example of an image forming portion) includes photosensitive drums 1 (1Y, 1M, 1C, 1K), charging rollers 2 (2Y, 2M, 2C, 2K), and developing devices 3 (3Y, 3M, 3C, 3K). The image forming unit 4 further includes primary transfer rollers 5 (5Y, 5M, 5C, 5K), a laser scanner unit 14, an intermediary transfer belt 6, a secondary transfer roller 16, a secondary transfer opposite roller 12, and the like.

From a cassette 10 which is provided at a lower portion of the image forming apparatus A and in which sheets S are stacked and accommodated, the sheet S is fed by a feeding roller 11. The sheet S passes through a feeding roller pair 18 and a registration roller pair 19 and is fed to the image forming unit 4. Each of the photosensitive drums 1 as image bearing members is irradiated with laser light emitted from the laser scanner unit 14, so that an electrostatic latent image is formed on the photosensitive drum 1. This electrostatic latent image is developed with toner by the developing device 3, so that a toner image is formed on the photosensitive drum 1. The toner image formed on the photosensitive drum 1 is primary-transferred onto the intermediary transfer belt 6 by the primary transfer roller 5. The resultant toner images transferred on the intermediary transfer belt 6 are collectively secondary-transferred onto the sheet S by the secondary transfer roller 16. The sheet S on which the toner images are transferred is then heated and pressed by a fixing device 15. By this, the toner images are fixed on the sheet S. Thereafter, the sheet S is discharged onto a discharge tray 7 by a discharging roller pair 13.

Further, the image forming apparatus A includes an image reading unit 8 for reading an image of an original. The image reading unit 8 is constituted by a reader 8a and an ADF 8b. The reader 8a optically reads the image of the original placed on an unshown platen table formed with a glass plate and then converts the image into image data. The ADF 8b automatically feeds the original stacked on an original tray 8b1 and then reads the image of the original. The ADF 8b is rotatably supported, and a user has access to the platen table of the reader 8a by rotating the ADF 8b so as to open upward.

Further, on a front surface side of the image forming apparatus A, an operating portion 9 enabling settings on image formation and settings on image reading is provided. The operating portion 9 has a function of displaying various pieces of information such as a state of the apparatus and has a function of enabling reception of an operation instruction for control. In this embodiment, the operating portion 9 includes a display portion 9a for displaying not only the various pieces of information such as the state of the apparatus to the user but also buttons enabling touch input of operation instructions by the user and includes keys for inputting numerical values and the like, and an outer casing cover 9c. The operating portion 9 further includes an unshown operation sound generating portion for generating various operation sounds with associated operations. The user is capable of making the settings on the image formation such as settings of a sheet size and the number of sheets subjected to the image formation and the settings on the image reading such as a setting of an original size by inputting the information by operating the display portion 9a or the keys 9b. Incidentally, characters, figures and other symbols displayed on the display portion 9a will be collectively referred to as icons.

Further, on the front surface side of the image forming apparatus A, at a position adjacent to the operating portion 9, an NFC interface 20 is provided. The NFC interface 20 is constituted by an unshown antenna for carrying out transmission and reception of radio waves and unshown IC chips for carrying out control of the NFC and establishes the NFC which is near field wireless communication between itself and the portable terminal M such as a smartphone possessed by the user. The NFC (Near Field Communication) is a non-contact wireless communication standard utilizing an electromagnetic wave of 13.56 MHz. Particularly, the NFC is a short-range wireless communication standard, of about 10 cm or less in communication distance, represented by ISO/IEO 18092, ISO/IEC 21481 and the like, and includes Felica (registered trademark), Mifare (registered trademark) and the like. In the system 100 in this embodiment, as the near-field wireless communication, the NFC is used, but the communication method is not limited thereto. For example, Bluetooth (registered tradename) will be considered as a kind of the near-field wireless communication.

The image forming apparatus A is also provided with a human sensor 30 (detecting means) for detecting a user approaching the image forming apparatus A. The human sensor 180 is disposed inside a slit 9d formed in the outer casing cover 9c of the operating portion 9, and transmits an ultrasonic wave and receives a reflected wave thereof, and thus detects the user.

Figure 3:
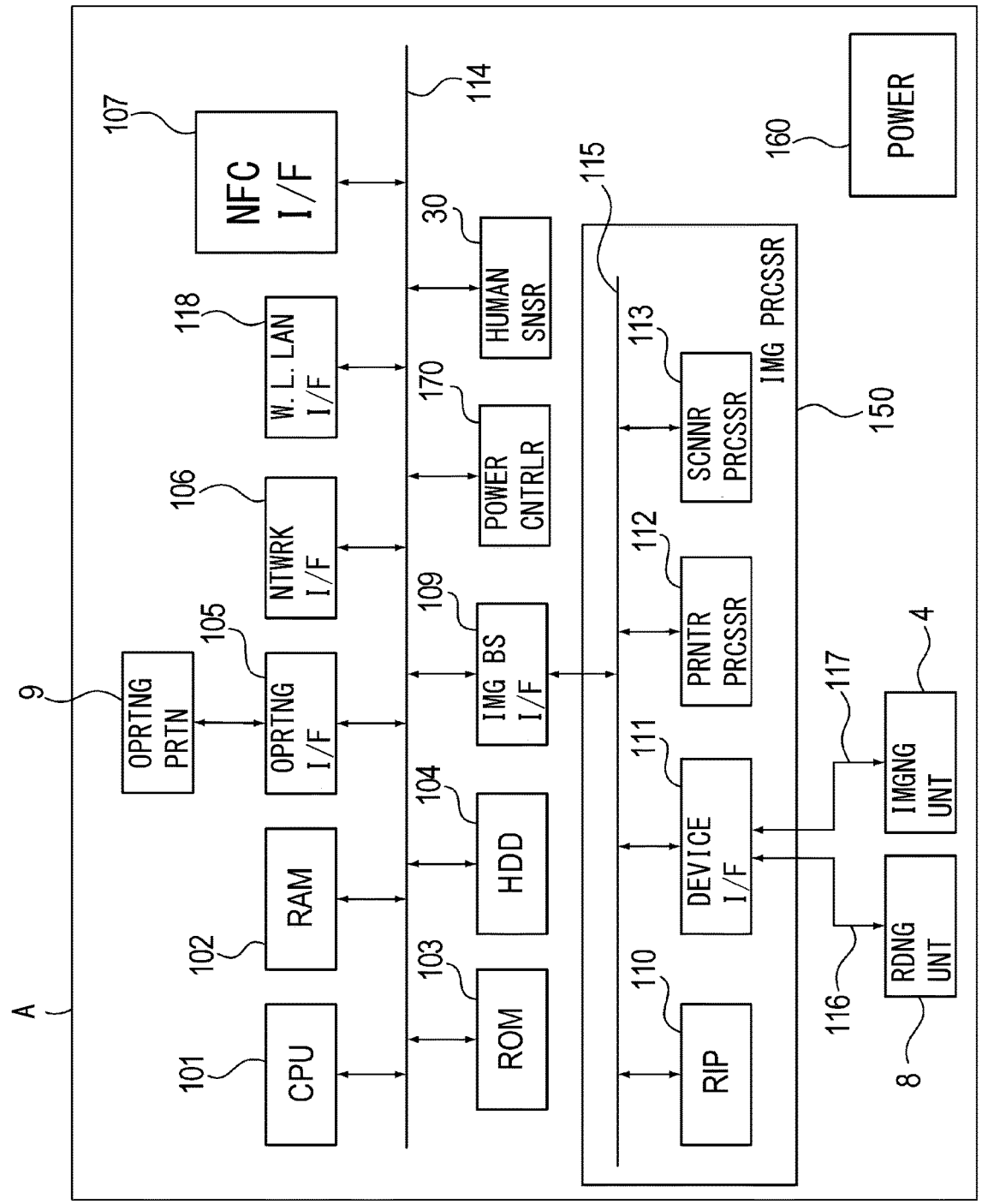
FIG. 3 is a block diagram showing a system constitution of the image forming apparatus.

FIG. 3 is a block diagram showing a system constitution of the image forming apparatus A. As shown in FIG. 3, the image forming apparatus A includes a CPU 101, a RAM 102 in which data used for calculation by the CPU 101 are temporarily stored, and a ROM 103 in which various programs are stored. The image forming apparatus A further includes an HDD 104 in which pieces of software and various settings on the control of the image forming apparatus A and saved documents are stored. The CPU 101 controls an entire operation of the image forming apparatus A, and on the basis of various pieces of information and the like acquired from an external device through an NFC interface 20 or a wireless LAN interface 118 which are descried later, the CPU 101 acquires various programs from the ROM 103 and then executes the various programs. That is, the CPU 101, the RAM 102, the ROM 103 and the HDD 104 constitute an example of the controller.

The image forming apparatus A is provided with a network interface 106 for varying out transmission and reception of data between itself and the external device through a LAN and with the wireless LAN interface 118 for carrying out transmission and reception of data between itself and the external device through wireless LAN communication. Further, the image forming apparatus A is provided with an operating portion interface 105 for relaying inputted data through the display portion 9a and the keys 9b of the operating portion 9a and image data to be displayed on the display portion 9a.

The image forming apparatus A includes a power controller 170 for switching supply of power to a specific device and a stop of the supply of the power to the specific device by receiving an instruction from the CPU 101. The power controller 170 controls a power supply device 160 which receives supply of power from a commercial power supply and which converts the power into power used in the respective devices and which then supplies the converted power to the respective devices. The above-described respective devices, the NFC interface 20 and the human sensor 30 are connected to each other through the system bus 114.

Here, the NFC interface 20 and the wireless LAN interface 118 will be described.

The NFC interface 20 is an example of a first interface enabling transmission and reception of wireless signals between itself and the portable terminal M. That is, the image forming apparatus A transmits various pieces of information to the portable terminal M through the NFC interface 20 and receives various pieces of information from the portable terminal M through the NFC interface 20.

Incidentally, a communication range of wireless communication through the NFC interface 20 is narrower than a communication range of wireless communication transmit the wireless LAN interface 118. Further, in general, a communication speed of the wireless communication through the NFC interface 20 is slower than a communication speed of the wireless communication through the wireless LAN interface 118. Here, the "various pieces of information" are specifically an "SSID" and a "password". The image forming apparatus A includes the wireless LAN interface 118 as described later. Further, the image forming apparatus A establishes the wireless communication (for example, Wi-Fi communication) with the portable terminal M through this wireless LAN interface 118. That is, the communication through the NFC interface 20 can also be said as communication for establishing subsequent Wi-Fi communication. That is, a user holds his (her) portable terminal M over the NFC interface 20 in order to establish a Wi-Fi communication state between the portable terminal M and the image forming apparatus A.

The wireless LAN interface 118 is an example of a second interface enabling transmission and reception of wireless signals between itself and the portable terminal M. That is, the image forming apparatus A transmits various pieces of information to the portable terminal M through the wireless LAN interface 118 and receives various pieces of information from the portable terminal M through the wireless LAN interface 118. Incidentally, a communication distance in which the wireless LAN interface 118 is capable of carrying out transmission and reception of the wireless signals between itself and the portable terminal M is longer than a communication distance of the NFC interface 20. Accordingly, the communication range of the wireless communication through the wireless LAN interface 118 is broader than the communication range of the wireless communication through the NFC interface 20. Further, in general, the communication speed of the wireless communication through the wireless LAN interface 118 is faster than the communication speed of the wireless communication through the NFC interface 20. The image data transmitted from the portable terminal M to the image forming apparatus A is large in volume in some instances. For that reason, in the near-field wireless communication through the NFC interface 20, it takes a long time to transmit the data. Therefore, the image data communication may suitably be established by the Wi-Fi communication rather than by the near-field wireless communication. However, in order to establish the Wi-Fi communication, the "SSID" and the "password" are needed. Therefore, the image forming apparatus A in this embodiment first transmits the "SSID" and the "password" by the near-field wireless communication through the NFC interface 20, and the portable terminal M establishes the Wi-Fi communication state with the image forming apparatus A by using these pieces of information.

The wireless LAN interface 118 is capable of carrying out in-direct wireless communication with the portable terminal M through the communication network N (FIG. 1). Specifically, the wireless LAN interface 118 is capable of establishing the wireless communication with the portable terminal M through a relaying (repeating) device such as an access point. Further, the wireless LAN interface 118 may also be capable of establishing direct wireless communication with the portable terminal M without through the relaying device. When Wi-Fi is taken as an example, of the Wi-Fi communication, wireless communication without through the relaying device is called "Wi-Fi direct communication" or the like. Specific communication procedure of the wireless LAN interface 118 is not particularly limited, but for example, the Wi-Fi can be employed for the indirect wireless communication, and the Wi-Fi direct communication can be employed for direct wireless communication.

Further, the wireless LAN interface 118 carries out transmission and reception of information on authentication or the like through the NFC interface 20 and establishes connection with the portable terminal M.

The image forming apparatus A includes an image processing portion 150 for processing the image. The image processing portion 150 is constituted by an RIP 110, a device interface 111, a printer image process portion 112, and a scanner image processing portion 113 and these means are connected to each other through an image bus 115. Further, the image bus 115 and the system bus 114 are connected to each other through an image bus interface 109, and by the image has interface 109, a relay between the image bus 115 and the system bus 114 and conversion of data structure are carried out.

The RIP 110 is a raster image processor, and converts a page-description language (PDL) code and a display list into bit-mapped images. The scanner image processing portion 113 subjects image data read by the image reading unit 8 to image processing such as correction, resolution conversion and the like. The printer image processing portion 112 subjects image data of the image formed by the image forming unit 4 to image processing such as correction, resolution conversion and the like.

The image reading unit 8 is connected to the image bus 115 through a scanner bus 116 and the device interface 111. The image forming unit 4 is connected to the image bus 115 through a print bus 117 and the device interface 111. The device interface 111 adjusts timing when the image data received from the image reading unit 8 is transmitted to the image bus 115 and timing when the image data is transmitted from the image bus 115 to the image forming unit 4.

Parts (a) and (b) of FIG. 4 are tables each for illustrating pieces of apparatus information of the image forming apparatus A stored in, for example, the HDD 104. As shown in parts (a) and (b) of FIG. 4, the HDD 104 stores an apparatus ID and function information, as apparatus information. The apparatus information is, for example, information set by a manufacturer during shipping of the image forming apparatus A. Parts (a) and (b) of FIG. 4 show examples of the apparatus information stored in image forming apparatuses of different types, respectively.

The apparatus ID is information for identifying the image forming apparatus A. The apparatus ID of the image forming apparatus indicated by the apparatus information of part (a) of FIG. 4 is MFP-A, and the apparatus ID of the image forming apparatus indicated by the apparatus information of part (b) of FIG. 4 is MFP-B.

An information category of the function information associated with information on printing includes color information, sheet size information and stapling information. The color information is information for indicating a color (for example, "monochromatic" or "color") used for printing of the image on the sheet. Each of the color information, the sheet size information and the stapling information is an example of items included in a printing condition. However, specific examples of the items included in the printing condition are not limited to these pieces of information.

The function information is information indicating functions capable of being executed by the image forming apparatus A. Specifically, the function information is information indicating a list of the printing condition capable of being set when printing of the image on the sheet is carried out.

The function information shown in part (a) of FIG. 4 indicates that set values of the color information, the sheet size information and the stapling information, as the printing condition of an operation relating to the printing carried out by the image forming apparatus A are settable. Specifically, as regards setting of the color information, only "monochromatic" is settable. As regards setting of the sheet size information, a sheet with either one of sizes of "A4", "A3" and "B5" is settable. Setting of the stapling information indicates that stapling is "enable". From these pieces of information, this image forming apparatus is a monochromatic image forming apparatus, and for example is an image forming apparatus which is provided with a sheet processing device or the like and which has a stapling function.

Further, an example of the function information shown in part (b) of FIG. 4 is information on functions possessed by the image forming apparatus different from the image forming apparatus having the function information shown in part (a) of FIG. 4. The function information shown in part (b) of FIG. 4 indicates that set values of the color information, the sheet size information and the stapling information, as the printing condition of an operation relating to the printing carried out by the image forming apparatus A are settable. Specifically, as regards setting of the color information, "monochromatic" or "color" is settable. As regards setting of the sheet size information, a sheet with a size of "A4" or "B5" is settable. Setting of the stapling information indicates that stapling is "disable". From these pieces of information, this image forming apparatus is a color image forming apparatus, and for example is an image forming apparatus which is not provided with a sheet processing device or the like and which does not have the stapling function.

In order to staple sheets, there is a need that a sheet processing device 50 is connected to the image forming apparatus A. In this embodiment, the sheet processing device 50 is provided in an in-body discharging space of the image forming apparatus A. The sheet processing device 50 is not only connected to a discharge portion of the image forming apparatus A but also constituted so as to be communicatable with the image forming apparatus A through a signal line (not shown). The sheet processing device 50 communicates with the image forming apparatus A and thus operates in cooperation with the image forming apparatus A. The sheet processing device 50 includes a movable stapler (an example of a stapling means) for performing a binding process in which sheets discharged from the image forming apparatus A are bound with a staple and includes a stapleless stapler (an example of the stapling means) for performing a binding process in which sheets discharged from the image forming apparatus A are bound without a staple. Incidentally, the constitution of the sheet processing device 50 is not limited to the constitution in which the sheet processing device 50 is provided in the in-body discharging space of the image forming apparatus A as described above. For example, shown in part (b) of FIG. 5 is a constitution in which the sheet processing device 50 is externally connected to the image forming apparatus A on a side downstream of the image forming apparatus A with respect to a sheet feeding direction.

<Portable Terminal>

FIG. 6 is a block diagram exemplarily showing a constitution of the portable terminal M. As shown in FIG. 6, the portable terminal M includes a CPU 301, a RAM 302 in which data used for calculation by the CPU 301 are temporarily stored, and a flash ROM 303 in which programs and various data used by the CPU 301 are stored.

The portable terminal M includes a wireless LAN interface 306 for carrying out transmission and reception of data between itself and an external device (the image forming apparatus A in this embodiment) through the wireless LAN communication such as Wi-Fi. The portable terminal M further includes an antenna (not shown) for carrying out radio waves and an NFC interface 307 for establishing NFC with the external device. The wireless LAN interface 306 and the NFC interface 307 of the portable terminal M are similar in constitution to the wireless LAN interface 118 and the NFC interface 20, respectively, of the above-described image forming apparatus A, and therefore, will be omitted from description.

The portable terminal M includes an operating portion 304 of a touch-panel type in which not only various pieces of information are displayed by an instruction from the CPU 301 but also various pieces of information are inputted to the CPU 301 through an operation by the user. The above-described devices are connected to each other through a system bus 309 and thus carry out transmission and reception of various data therebetween.

<Application>

Parts (a) to (d) of FIG. 7 are schematic views each showing a screen of the portable terminal M in a state in which a dedicated application is launched in the portable terminal M in order to perform authentication through the NFC. Part (a) of FIG. 7 is the screen displayed on the portable terminal M when the dedicated application is launched. At this time, the portable terminal M radiates an electromagnetic wave and is searching a partner establishing the near-field wireless communication between itself and the partner. In this embodiment, at a lower portion of the screen, an item of "CANCEL" is provided. When the user touches this item, the portable terminal M stops the radiation of the electromagnetic wave, and the application ends. Further, the application also ends automatically in the case of a lapse of a predetermined time from a start of display of the "SEARCHING . . . " screen.

The user holds the portable terminal M over the NFC interface 20 when the above-described screen is displayed on the portable terminal M. Then, the "SSID" and the "password" necessary for the portable terminal M to establish the Wi-Fi connection with the image forming apparatus A are transmitted from the image forming apparatus A to the portable terminal M through the NFC interface 20. Then, the portable terminal M establishes the Wi-Fi connection with the image forming apparatus A with use of the "SSID" and the "password" transmitted from the image forming apparatus A.

Part (b) of FIG. 7 is the screen temporarily displayed on the portable terminal M in response to establishment of the Wi-Fi communication between the portable terminal M and the image forming apparatus A. This screen is displayed, whereby the user is capable of confirming that the Wi-Fi communication between the portable terminal M and the image forming apparatus A was established.

After the screen of part (b) of FIG. 7 is temporarily displayed, the screen changes to the screen of part (c) of FIG. 7. The screen of part (c) of FIG. 7 is a job selection screen for selecting a job to be executed. In this embodiment, on the job selection screen, three items of "CAPTURE", "PRINT" and "END APPLICATION" are displayed. Incidentally, the items displayed on this screen are not limited to the above three items. Other specifications in which a job other than the "CAPTURE" job and the "PRINT" job can be selected and in which in addition to these jobs, another job can be selected may also be employed.

Here, functions of the two jobs of "CAPTURE" and "PRINT" which can be executed by using the application in this embodiment will be briefly described.

The "CAPTURE" is the function of capturing, as an image, data of an original read (scanned) by the image forming apparatus A into the portable terminal M. When the original is read by the image forming apparatus A, for example, the image reading unit 8 can be used. In the case where the screen of part (b) of FIG. 7 is displayed and the Wi-Fi communication between the portable terminal M and the image forming apparatus A is established, the user sets an original, intended to be captured into the portable terminal M, on the original tray 8b1 of the image reading unit 8 or on a platen table (not shown) of the reader 8a. Thereafter, when the user touches the item "CAPTURE" on the screen of part (c) of FIG. 7, reading of the original by the image reading unit 8 is started.

When the reading of the original is ended, the image forming apparatus A transmits the image data of the read original to the portable terminal M through the Wi-Fi communication. Thus, the capture of the original (data) into the portable terminal M is completed.

The "PRINT" is the function of printing an image or a document file which are saved in the portable terminal M or a WEB page during browsing by the portable terminal M or the like, by the image forming apparatus A. When the user touches the item "PRINT" on the screen of part (c) of FIG. 7, the screen changes to the screen of part (d) of FIG. 7. The screen of part (d) of FIG. 7 is an example showing a list screen of files capable of being printed by using the image forming apparatus A. On this screen, the user selects the file which the user desires to print. When the file is selected, the image data relating to the selected file is transmitted to the image forming apparatus A. On the basis of the image data transmitted from the portable terminal M, the image forming apparatus A forms an image and prints the image on a sheet. Thus, the user is capable of printing the image or the document file which are saves in the portable terminal M or the WEB page during browsing by the portable terminal M. Compared with the near-field wireless communication such as the NFC, in the wireless communication such as the Wi-Fi communication, capacity of data communicatable per unit time is large, and therefore, even data such as a graphic image or the document file can be smoothly transferred.

Here, the mode of the application is not limited to those in this embodiment described above. For example, first the screen shown in part (c) of FIG. 7 is displayed, and then the user selects an operation to be executed. In this case, for example, when the user selects the "PRINT", the user selects the image file to be printed (part (d) of FIG. 7), and then holds the portable terminal M over the NFC interface 20 of the image forming apparatus A. Then, in response to holding of the portable terminal M over the NFC interface 20 of the image forming apparatus A, authentication is performed, and thereafter the Wi-Fi communication is started, so that a desired image is printed. The user first selects an image which the user desired to print and then holds the portable terminal M over the NFC interface 20, so that the image is printed by the image forming apparatus A, and therefore, the image is capable of being printed by a simple operation.

Parts (a) and (b) of FIG. 8 are screens of the portable terminal M when the user selects the "PRINT" in the application of the portable terminal M (part (c) of FIG. 7). The user sets various printing conditions on these screens. In this embodiment, for easy understanding of description, description will be made using two kinds of the screens as shown in parts (a) and (b) of FIG. 8.

On a printing condition setting screen in this embodiment, it is possible to make three settings of "color setting" for setting either one of printing of a color image and printing of a monochromatic image, "sheet size setting" for selecting a size of a sheet subjected to the printing, and "stapling setting" for setting whether or not stapling is performed.

For example, as shown in part (a) of FIG. 8, on this screen, in an item of "COLOR SETTING", a radio button 401 is provided, and it is possible to select whether the color image is printed or the monochromatic image is printed. In this example, setting is made so as to print the color image. Also, in an item of "SHEET SIZE SETTING", a radio button 402 is provided. In this item, as the size of the sheet to be printed, four kinds of "A4", "A3", "B5" and "B4" are provided. In this example, setting is made so as to form the image on the A4-size sheet. Further, also, in an item of "STAPLING SETTING", a radio button 403 is provided. In this item, it is possible to set either one of "YES" (enable) or "NO" (disable) of the stapling setting. In this embodiment, setting is made so that the stapling setting is performed ("YES").

However, on the application side of the portable terminal M, whether or not the sheet processing device 50 is connected to the image forming apparatus A is not known. For that reason, even unless the sheet processing device 50 is connected to the image forming apparatus A, on the printing condition setting screen of part (a) of FIG. 8, the stapling setting of "YES" is settable. For that reason, there is a liability that although the sheet processing device 50 is not connected to the image forming apparatus A, the user does not notice the matter and selects the stapling setting of "YES".

As shown in part (a) of FIG. 8, at a lower portion of the screen, a "DETERMINE" button 404 is provided. By pressing the "DETERMINE" button 404, respective set values of the "COLOR SETTING", the "SHEET SIZE SETTING" and the "STAPLING SETTING" are transmitted to the image forming apparatus A.

Further, for comparison with the screen of part (a) of FIG. 8, a screen different in setting from the screen of part (a) of FIG. 8 is shown in part (b) of FIG. 8. In this example, the color printing is set in the item of "COLOR SETTING", an A3-size sheet is set in the item of "SHEET SIZE SETTING", and execution of the stapling is set in the item of "STAPLING SETTING".

<Comparison Between Set Value and Apparatus Information>

As shown in parts (a) and (b) of FIG. 4, depending on image forming apparatuses, functions possessed by the image forming apparatuses are different. However, on the portable terminal M side, whether the image forming apparatus as a transmission destination of a print job has what function cannot be grasped.

For example, a situation in which the user uses an image forming apparatus installed in a convenience store, a library or the like and carries out printing will be considered. The user launches the application in his (her) portable terminal M and makes various settings. In the case where the user desires to carry out color printing, the user sets a set value at "COLOR" by the radio button 401 on the screen of FIG. 8 displayed on the portable terminal M. However, the image forming apparatus which the user intends to use is not always compatible with the color printing. Therefore, the set value of the printing condition transmitted from the portable terminal M and the set value of the image forming apparatus A are compared with each other, whereby whether or not the image forming apparatus A is capable of carrying out the printing (the color printing in this example) under the printing condition selected by the user is discriminated. Then, in the case where discrimination that the image forming apparatus A is incapable of carrying out the printing under the selected printing condition was made, a message to the effect that "printing is impossible" is displayed on the display portion 9a of the operating portion 9. By doing so, the user is capable of knowing that the color printing cannot be carried out by the image forming apparatus currently used by him (her) self.

However, in this case, some users give up the printing itself and other users desire to carry out monochromatic printing instead of the color printing. In the latter case, there is a need to set the printing condition again, and such a setting is troublesome. Therefore, in this embodiment, a message to the effect that "color printing is impossible" is displayed, and at the same time or thereafter, "proposal of monochromatic printing" is made. This will be specifically described.

FIG. 9 is a flowchart for illustrating a control flow of the image forming apparatus A when the "DETERMINE" button (FIG. 8) is pressed down in the application of the portable terminal M.

A "START" of S1000 shows a point of time when the CPU 101 discriminated that the "DETERMINE" button is pressed down on the portable terminal M side in a state in which the wireless communication is established between the portable terminal M and the image forming apparatus A. In response to the pressing-down of the "DETERMINE" button, pieces of information on set values about various printing conditions are transmitted from the portable terminal M to the image forming apparatus A. These pieces of information on the various set values are also referred to as a printing job.

In this embodiment, the CPU 101 compares each of set values set in the portable terminal M in the order of "color information", "sheet size information" and "stapling information" with associated one of set values settable on the image forming apparatus A side. Incidentally, the order of the comparison is not limited to the above-described order. For example, first, the set value for the "sheet size information" on the portable terminal M side may also be compared with the set value on the image forming apparatus A side.

S1001 is a step of discriminating whether or not the set value for the color information transmitted from the portable terminal M is settable in the image forming apparatus A. The CPU 101 functions as a discrimination processor. In the following description, description will be made on assumption that the printing condition on the portable terminal M side is the condition shown in part (a) of FIG. 8 and that the image forming apparatus A has the functions of the MFP-A as the apparatus ID shown in part (a) of FIG. 4. On the portable terminal M side, as the set value about the color information, "color" is set. Accordingly, in S1001, the CPU 101 discriminates whether or not the set value "color" is settable in the image forming apparatus A. Here, as shown in part (a) of FIG. 4, the image forming apparatus A in this example is impossible to set the "color" as the color information. For that reason, the CPU 101 causes the display portion 9a of the operating portion 9 to display a setting screen not only for displaying a message to the effect that the color setting is impossible but also for selecting color setting in which the set value which cannot be set is replaced with a (settable) set value (S1003). On the setting screen, an "OK" button or a "CANCEL" button, by which whether or not printing is carried out under a replaced color setting is displayed. For example, as shown in part (a) of FIG. 10, on a setting screen 1101 displayed on the display portion 9a of the operating portion 9, not only the message to the effect that the color setting is impossible (due to a monochromatic image forming apparatus) is displayed but also an "OK" button 1104 providing an instruction to carry out printing at a set value 1103 (grayscale in this example) used instead of the set value, of color information 1102, which cannot be settable and a "CANCEL" button 1105 providing an instruction to end the printing condition process without carrying out the printing are displayed. When the "OK" is selected on the setting screen for the replaced color setting, the CPU 101 stores the set value for the replaced color information in a storing portion such as the RAM 102 or the ROM 103 (S1004), and the process goes to a subsequent comparison of set values (S1006). On the other hand, the "CANCEL" is selected. The CPU 101 erases the printing job transmitted from the portable terminal M (S1005). A step of "END" shown in S1014 refers to a point of time when the printing job transmitted from the portable terminal M to the image forming apparatus A is erased on the basis of an instruction from the CPU 101.

On the other hand, in S1001, in the case where the CPU 101 discriminated that the set value for the color information transmitted from the portable terminal M is settable in the image forming apparatus A, the CPU 101 stores the set value in the storing portion such as the RAM 102 or the ROM 103 (S1002). In this example, in the case where as the set value for the color setting, "monochromatic" is set on the portable terminal M side, the CPU 101 stores this set value in the RAM 102 or the ROM 103.

Similarly, in S1006, the CPU 101 discriminates whether or not a set value for the sheet size information transmitted from the portable terminal M is settable in the image forming apparatus A. In this example, as the set value, "A4" is set on the portable terminal M side. Accordingly, the CPU 101 discriminates whether or not the set value "A4" can be set in the image forming apparatus A. As shown in part (a) of FIG. 4, the image forming apparatus A is capable of setting the sizes of "A4", "A3" and "B5". For this reason, in S1006, the CPU 101 discriminates as being "settable", and the process goes to S1007. In S1007, the CPU 101 stores, as the sheet size, the set value indicating "A4" in the storing portion such as the RAM 102 or the ROM 103. In the case where the image forming apparatus A is an image forming apparatus by which printing of the image on the A4-size sheet cannot be carried out, the CPU 101 causes the display portion 9a of the operating portion 9 to display a setting screen not only for displaying a message to the effect that the image cannot be printed on the A4-size sheet but also for selecting sheet size setting with which the set value which is not settable is replaced (S1008). Here, on the setting screen, an "OK" button and a "CANCEL" button which are used for determining whether or not the printing is carried out under the replacement sheet size setting are displayed. Incidentally, the replacement sheet size setting is not limited thereto. For example, in the case where a plurality of replacement sheet size settings exist, sheet sizes selectable as replacement sheet sizes are displayed on a setting screen and then the selection may also be determined by the "OK" button. When the "OK" button is selected on the setting screen of the replacement sheet size setting, the CPU 101 stores the set value for the replacement sheet size in the storing portion such as the RAM 102 or the ROM 103 (S1009), and the process goes to subsequent comparison of set values (S1011). On the other hand, when the "CANCEL" button is selected, the CPU 101 erases the printing job transmitted form the portable terminal M, i.e., the various set values set in the portable terminal M (S1010).

Further, in S1011, the CPU 101 discriminates whether or not a set value for the stapling information transmitted from the portable terminal M is settable in the image forming apparatus A. In this example, as the set value, "stapling: YES" is set on the portable terminal M side. Accordingly, the CPU 101 discriminates whether or not the stapling can be performed in the image forming apparatus A. As shown in part (a) of FIG. 4, the image forming apparatus A is capable of performing the stapling. For this reason, in S1011, the CPU 101 discriminates as being "settable", and the process goes to S1012. In S1012, the CPU 101 stores, as the set value about the stapling information, the set value indicating a message to the effect that the stapling is executed in the storing portion such as the RAM 102 or the ROM 103. In the case where the image forming apparatus A is an image forming apparatus by which the stapling cannot be executed, the CPU 101 causes the display portion 9*a* of the operating portion 9 to display a setting screen not only for displaying a message to the effect that the stapling cannot be executed but also for selecting stapling setting with which the set value which is not settable is replaced (S1013). Here, on the setting screen, an "OK" button and a "CANCEL" button which are used for determining whether or not the printing is carried out under the replacement stapling setting are displayed. Incidentally, the replacement sheet size setting is not limited thereto. When the "OK" button is selected on the setting screen of the replacement stapling setting, the CPU 101 stores the set value for the replacement stapling in the storing portion such as the RAM 102 or the ROM 103 (S1014), and the process goes to subsequent process (S1016). On the other hand, when the "CANCEL" button is selected, the CPU 101 erases the printing job transmitted form the portable terminal M, i.e., the various set values set in the portable terminal M (S1015).

Thereafter, in S1016, the CPU 101 calls up the set value relating to the printing condition stored in the RAM 102 or the ROM 103 and causes the image forming apparatus A to perform a printing operation on the basis of the set value. At that time, for example, as shown in part (b) of FIG. 10, on the setting screen 1101 displayed at the display portion 9*a* of the operating portion 9, not only the set value about the printing condition is displayed but also a message that the printing operation is performed under the above-described printing condition is displayed.

Here, "END" of S1017 means a point of time when the printing operation is ended or when the printing job is erased.

As described above, in the image forming apparatus A in this embodiment, the CPU 101 discriminates whether or not the set value set in the portable terminal M is settable in the image forming apparatus A, and in the case where the setting is impossible, not only the message to that effect is displayed on the display portion 9*a* but also the setting screen (replacement setting screen) for selecting the replacement set value is displayed on the display portion 9*a*. For that reason, in the case where the printing operation cannot be performed under the printing condition set by the user himself (herself), the user can know that effect through the display portion 9*a* of the image forming apparatus A, and can cause the image forming apparatus A to perform printing at the replacement set value. Accordingly, according to this embodiment, even in the case where the printing condition designated in the portable terminal M does not exist in the printing condition of the image forming apparatus A, printing can be performed under a replacement printing condition by the image forming apparatus A without designating a new printing condition in the portable terminal M. By this, it is possible to save the user the trouble of setting the printing condition again, and it leads to an improvement in productivity. Incidentally, in the description of the above-mentioned embodiment, the embodiment in which the "print setting screen" is displayed together with the "screen of message to the effect that printing is impossible" at the display portion 9*a* was described. However, these screens are not necessarily required to be displayed at the same time, but the "replacement setting screen" may also be displayed after the "screen of message to the effect that printing is impossible" is displayed. Specifically, first, the "screen of message to the effect that printing is impossible" is displayed, and in response to pressing-down of the "OK" button or the like on the screen by the user, the "replacement setting screen" may also be displayed. Thus, by causing the user to take two actions, it is possible to reduce a liability that the user who does not desire to make replacement setting erroneously makes the replacement setting.

Embodiment 2

An image forming apparatus according to an embodiment 2 will be described. In the image forming apparatus according to this embodiment, for the purpose of sheet saving or the like, an upper limit of the number of pages of print data is preset as a threshold. Then, in the case where the number of pages of print data received from the portable terminal exceeds the threshold, not only a message to the effect that the number of pages of the print data exceeds the threshold is displayed on the operating portion but also a replacement condition prompting the user to change the received printing condition is displayed on the operating portion.

Specifically, in the case where the number of pages of the print data received from the portable terminal exceeds the threshold, as the replacement condition, an instruction of "2 in 1" printing in which print data of a plurality of pages and printed on a single sheet by reduction is displayed on the operating portion so as to be capable of being received.

FIG. 11 is a schematic view showing a display example of a setting screen 1201 of an operating portion 9 in the image forming apparatus according to the embodiment 2. On the setting screen 1201 of the operating portion 9 shown in FIG. 11, the case where the printing condition prompting the change is a printing layout is shown. On the setting screen 1201 of the operating portion 9, a replacement condition 1201 for the printing condition prompting the change ("LAYOUT" in this example) 1202 is displayed. As the replacement condition 1203, an "OK" button 1204 instructing printing under the replacement condition, a "STAY" button 1205 instructing that the printing condition is not changed, and a "CANCEL" button 1206 instructing an end of the printing process without carrying out the printing are displayed.

Next, using FIG. 12, a control flow of the image forming apparatus when the "DETERMINE" button is pressed down in the application of the portable terminal will be described.

A "START" of S2000 shows a point of time when the CPU 101 discriminated that the "DETERMINE" button is pressed down on the portable terminal M side in a state in which the wireless communication is established between the portable terminal M and the image forming apparatus A. In response to the pressing-down of the "DETERMINE" button, pieces of information on set values about various printing conditions are transmitted from the portable terminal M to the image forming apparatus A. These pieces of information on the various set values are similar to those in the above-described embodiment, and therefore will be omitted from description. In the description using FIG. 12, only the number of pages of print data of the printing condition transmitted from the portable terminal M to the image forming apparatus A will be described.

S2001 is a step of discriminating whether or not the number of pages of the print data which is a set value transmitted from the portable terminal M exceeds the threshold preset on the image forming apparatus A side. Here, as the upper limit (threshold) of the number of pages of the print data, "20" is set. Accordingly, in S2001, the CPU 101 discriminates whether or not the set value transmitted from the portable terminal M exceeds the threshold on the image forming apparatus A side. Here, for example, in the case where the set value is "22", the set value exceeds "20" which is the upper limit (threshold) on the image forming apparatus A side. For that reason, the CPU 101 causes the display portion 9a of the operating portion 9 to display not only a message to the effect that the number of pages exceeds the threshold but also a setting screen for selecting a printing condition (replacement condition) prompting the change (S2003). Here, on the setting screen of the operating portion 9, for example, as shown in FIG. 11, the "OK" button 1204 instructing printing under the replacement condition, the "STAY" button 1205 instructing the printing with no change in printing condition, and the "CANCEL" button 1206 instructing the end of the printing process without carrying out the printing are displayed. When the "OK" button is selected on the setting screen, the CPU 101 causes the storing portion such as the RAM 102 or the ROM 103 to store a replacement set value which is a replacement condition (S2004), and the processing goes to a subsequent step (S2006). On the other hand, when the "CANCEL" button is on the setting screen, the CPU 101 erases the printing job transmitted from the portable terminal M (S2005). Further, when the "STAY" button is selected on the setting screen, in S2002, the CPU 101 causes the storing portion such as the RAM 102 or the ROM 103 to store the set value (the number of pages of the print data) received from the portable terminal M.

On the other hand, in S2001, in the case where the CPU 101 discriminated that the number of pages of the print data which is the set value transmitted from the portable terminal M does not exceed the threshold preset on the image forming apparatus A side, the CPU 101 causes the storing portion such as the RAM 102 or the ROM 103 to store the set value (S2002).

Thereafter, in S2006, the CPU 101 calls up the set value relating to the printing condition stored in the RAM 102 or the ROM 103 and causes the image forming apparatus A to perform a printing operation on the basis of the set value.

Here, "END" of S2007 means a point of time when the printing operation is ended or when the printing job is erased.

As described above, in the image forming apparatus A in this embodiment, the CPU 101 discriminates whether or not the set value set in the portable terminal M exceeded the threshold preset in the image forming apparatus A, and in the case where the set value exceeded the threshold, not only the message to that effect is displayed on the display portion 9a but also the setting screen for selecting the replacement condition is displayed on the display portion 9a. For that reason, the user can cause the image forming apparatus A to perform the printing under the printing condition set by the user himself (herself), and in addition, the user can select printing under the replacement condition and can also cause the image forming apparatus A to perform printing at the replacement set value. Accordingly, also, in this embodiment, printing can be performed under the replacement printing condition by the image forming apparatus A without designating a new printing condition in the portable terminal M.

Incidentally, in this embodiment, of the printing condition transmitted from the portable terminal M to the image forming apparatus A, only the number of pages of the print data was described, but can also be added to the comparison between the various set values with the pieces of the apparatus information described in the embodiment 1. Or, the number of pages of the print data can also be combined with comparison with set values for other printing conditions.

Embodiment 3

An image forming apparatus according to an embodiment 3 will be described. In the image forming apparatus according to this embodiment, an upper limit of the number of pages of print data is preset as a threshold. Then, in the case where the number of pages of print data received from the portable terminal exceeds the threshold, not only a message to the effect that the number of pages of the print data exceeds the threshold is displayed on the operating portion but also a replacement condition prompting the user to change the received printing condition is displayed on the operating portion.

Specifically, in the case where the number of pages of the print data received from the portable terminal exceeds the threshold, as the replacement condition, an instruction to subject the sheet after the printing to stapling is displayed on the operating portion so as to be capable of being received.

FIG. 13 is a schematic view showing a display example of a setting screen 1501 of an operating portion 9 in the image forming apparatus according to the embodiment 3. On the setting screen 1501 of the operating portion 9 shown in FIG. 13, the case where the printing condition prompting the change is stapling (post-process) is shown. On the setting screen 1201 of the operating portion 9, a replacement condition 1503 for the printing condition prompting the change ("LAYOUT" in this example) 1502 is displayed. As the replacement condition 1503, an "OK" button 1504 instructing the stapling which is the replacement condition, a "STAY" button 1505 instructing that the printing condition is not changed, and a "CANCEL" button 1506 instructing an end of the printing process without carrying out the printing are displayed.

When the "OK" button is selected on this setting screen of the operating portion 9, the stapling for binding sheets after the printing is performed. On the other hand, when the "STAY" button is selected on the setting screen, the printing is carried out without performing the stapling. Further, when the "CANCEL" button is selected on the setting screen, the printing process is stopped and ended.

As described above, also, this embodiment, in the case where the set value set in the portable terminal M exceeded the threshold preset in the image forming apparatus A, not only the message to that effect is displayed on the operating portion 9 but also the setting screen capable of selecting replacement condition is displayed on the operating portion 9. For that reason, the user can cause the image forming apparatus A to perform the printing under the printing condition set by the user himself (herself), and in addition, the user can select printing under the replacement condition and can also cause the image forming apparatus A to perform printing at the replacement set value. Accordingly, also, in this embodiment, printing can be performed under the replacement printing condition by the image forming apparatus A without designating a new printing condition in the portable terminal M.

Embodiment 4

In the embodiment 1, the example in which the "replacement setting screen" is displayed on the display portion 9a of the operating portion 9 was described, but in this embodiment, an example in which a "replacement setting screen" is displayed on a display portion 90 of the portable terminal M will be described.

As described in the embodiment 1, the portable terminal M acquires the "SSID" and the "password" by the near field wireless communication through the NFC interface 20 and then established the W-Fi communication state with use of these pieces of information. Here, in general, in the case where the Wi-Fi communication state is established once, in the portable terminal M, pieces of information on the "SSID" and the "password" are stored. That is, in the case where the user desires to establish the Wi-Fi communication again with the image forming apparatus with which the Wi-Fi communication is established once, there is no need to acquire the "SSID" and the "password" again through the NFC interface 20.

FIG. 14 is an example of a Wi-Fi connection setting screen displayed on the portable terminal M possessed by the user in the case where the user approaches the image forming apparatus with which the user establishes the Wi-Fi communication once. Then, information on the image forming apparatus with which the user established the Wi-Fi communication in the past is displayed on the display portion 90 of the portable terminal M. The user touches an icon 91 relating to the image forming apparatus displayed on the display portion 90, so that the user tries to establish the Wi-Fi communication with the image forming apparatus A by using the "SSID" and the "password" which are stored in the portable terminal M itself. That is, in the case where the user desires to use the image forming apparatus with which the user established the Wi-Fi connection once, there is no need to take the trouble to hold the portable terminal M over the NFC interface 20. For that reason, the user is capable of providing an instruction to carry out printing under a desired printing condition to the image forming apparatus by using the portable terminal M from a remote place from the image forming apparatus.

However, in this case, in the place remote from the image forming apparatus A, the user operates the portable terminal M, and therefore, the user does not view the display portion 9a of the operating portion 9 of the image forming apparatus A in some instances. That is, in the case where the user sets, in his (her) portable terminal M, a printing condition which cannot be set in the image forming apparatus A and then provides a printing instruction, the user cannot know that "setting is impossible". Therefore, in this embodiment, an example in which a message to the effect that "setting is impossible" and a "replacement setting screen" are displayed on the display portion 90 of the portable terminal M will be described.

Part (a) of FIG. 15 is an example of a screen displayed on the portable terminal M in the case where the user causes the portable terminal M to provide an instruction to carry out color printing in a monochromatic image forming apparatus. Thus, not only on the display portion 9a of the operating portion 9 but also on the display portion 90 of the portable terminal M, the message to the effect that "setting is impossible" and the "replacement setting screen" are displayed. By this, even when the user stays in the place remote from the image forming apparatus A, the user can know that in the image forming apparatus A, the printing under the printing condition set in the portable terminal M by the user himself (herself) cannot be carried out.

In addition, a replacement means (monochromatic printing in this example) has been proposed, and therefore, there is no need that the user takes the trouble to set the printing condition again. By this, improvement in productivity can be expected.

Incidentally, on a screen of part (a) of FIG. 15, the message to the effect that "setting is impossible" and the "replacement setting screen" were displayed simultaneously, but display timing of these screens does not have to be simultaneously. Part (b) of FIG. 15 is a screen of the portable terminal M notifying the message to the effect that "setting is impossible". When the user touches an "OK" button on this screen, a screen shown in part (c) of FIG. 15 is displayed at the display portion 90 of the portable terminal M. The screen shown in part (c) of FIG. 15 is a screen on which the user is caused to select whether or not as a replacement means, monochromatic printing is executed. When the user touches a "Yes" button, instead of the color printing, the monochromatic printing is executed. On the other hand, unless the color printing can be carried out, the user who desires to give up the printing itself touches a "No" button. When the "No" button is touched, the printing operation itself is not performed. Thus, the message to the effect that "setting is impossible" and the "replacement setting screen" are displayed at different timings or on different screens, whereby it is possible to reduce a liability that the user who does not desired to execute the printing with the replacement means erroneously executes the printing with the replacement means.

OTHER EMBODIMENTS

In the above-described embodiment 2, as the replacement condition for saving the number of printed sheets, the case of the "2 in 1" printing in which print data of 2 pages are printed on the single sheet was described as an example, but the constitution in which the print data of 2 pages are printed on the single sheet is not limited thereto. For example, when the image forming apparatus has a double-side printing function, a constitution in which the print data of the plural pages are printed on the single sheet by printing the print data on double (both) sides of the single sheet may also be employed. Further, as the replacement means for saving the number of printed sheets, a constitution in which print data of 4 pages are printed on a single sheet through a "4 in 1" printing may also be employed, and in addition, may also be combined with the double-side printing.

Further, in the above-described embodiment 3, as the replacement means, the stapling as the post-process was described as an example, but when the image forming apparatus has, in addition to the function of the stapling, a sorting function of sorting the sheets, a fold-back function (book binding function) of folding back the sheets, or the like function as the post-process, these post-processes may also be employed as the replacement condition.

Further, in the above-described embodiments 1 to 3, the constitution including the first interface and the second interface which has the communication distance, longer than the first interface, in which the wireless signals can be transmitted and received between itself and the portable terminal was described as an example. Specifically, a handover type in which the wireless LAN setting information is transmitted through the NFC interface (first interface) and actual print data is received through the wireless LAN interface (second interface) was described. However, the present invention is not limited thereto. For example, when the capacity of reception data and the communication speed are permissible, all the communications may also be carried out through the NFC interface. That is, a constitution including a single interface capable of carrying out transmission and reception of the wireless signals between itself and the portable terminal may also be employed.

Further, the NFC interface may also be used as the first interface, and the Wi-Fi (registered trademark) interface may also be used as the second interface faster in communication speed and broader in communicatable range than the first interface. Or, a constitution in which the NFC interface is used as the first interface and a Bluetooth (registered trademark) is used as the second interface may also be employed. Or, a constitution in which the Bluetooth interface is used as the first interface and the Wi-Fi interface is used as the second interface may also be employed. Thus, a combination of the first interface with the second interface faster in communication speed and broader in communicatable range than the first interface may also be employed.

Further, in the above-described embodiments, the constitution in which one kind (for example, either one of the color information, the sheet size information and the stapling information) of the replacement printing conditions is displayed on the setting screen of the display portion was described as an example, but the present invention is not limited thereto. For example, a plurality of replacement conditions (for example, all the color information, the sheet size information and the stapling information) may also be displayed in parallel. Further, as specific examples of the items contained in the printing conditions, the color information, the sheet size information and the stapling information were described, but the present invention is not limited thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-028665 filed on Feb. 21, 2020, which is hereby incorporated by reference herein in its entirety.

What is claimed is:

1. An image forming apparatus comprising:
an image forming assembly configured to form an image on a sheet;
a first interface capable of transmitting and receiving a wireless signal between itself and a portable terminal;
a second interface having a communication distance in which a wireless signal is capable of being transmitted and received, said communication distance being longer than a communication distance of said first interface;
a display configured to display information on a printing condition;
a discrimination processor configured to discriminate whether or not a set value of the printing condition set by the portable terminal, received from the portable terminal through said second interface, is capable of being set by said image forming apparatus; and
a controller configured to control said image forming assembly and said display,
wherein
when said discrimination processor discriminates that the set value is capable of being set, said controller causes said image forming assembly to form the image under the printing condition depending on the set value, and
when said discrimination processor discriminates that the set value is not capable of being set, said controller causes said display to display a message that the set value is not capable of being set and a message of a printing condition based on another set value capable of being set instead of the set value by said image forming apparatus.

2. The image forming apparatus according to claim 1, wherein said first interface carries out near field wireless communication of 10 cm or less in distance between itself and the portable terminal.

3. The image forming apparatus according to claim 2, wherein said second interface establishes connection with the portable terminal through said first interface and then carries out transmission and reception of a wireless signal between itself and the portable terminal.

4. The image forming apparatus according to claim 1, wherein when said discrimination processor discriminates that the set value is not capable of being set, said controller causes said display to display a message that the set value is not capable of being set and an icon confirming that a user accepts the message, and then in response to selection of the icon by the user, said controller causes said display to display a printing condition based on another set value settable by the image forming apparatus instead of the set value.

5. The image forming apparatus according to claim 1, wherein when said discrimination processor discriminates that the set value is not capable of being set, said controller causes said display to display an icon for providing an instruction to cause said image forming assembly to form the image under a printing condition based on another set value settable by the image forming apparatus instead of the set value.

6. The image forming apparatus according to claim 1, wherein the printing condition depending on the set value is that a color image is printed, and the printing condition based on said another set value is that a monochromatic image is printed.

7. The image forming apparatus according to claim 1, wherein when a number of total pages of printing under the printing condition portion depending on the set value exceeds a preset threshold set for the image forming apparatus, said controller causes said display to display a message that the number of total pages exceeds the preset threshold and causes said display to display, as the printing condition based on said another set value, a screen for causing a user to select whether or not images on a plurality of pages are printed on a single sheet by double side printing or reduced size printing.

8. An image forming apparatus comprising:
an image forming assembly configured to form an image on a sheet;
a first interface capable of transmitting and receiving a wireless signal between itself and a portable terminal;
a second interface having a communication distance in which a wireless signal is capable of being transmitted and received, said communication distance being longer than a communication distance of said first interface;

a display configured to display information on a printing condition;

a discrimination processor configured to discriminate whether or not a set value of the printing condition set by the portable terminal, received from the portable terminal through said second interface is capable of being set by said image forming apparatus; and a controller configured to control said image forming assembly and said display, wherein when said discrimination processor discriminates that the set value is capable of being set, said controller causes said image forming assembly to form the image under the printing condition depending on the set value, and when said discrimination processor discriminates that the set value is not capable of being set, said controller transmits, to the portable terminal through said second interface, a signal for causing a display of the portable terminal to display a message that the set value is not capable of being set and a message of a printing condition based on another set value capable of being set instead of the set value by said image forming apparatus.

9. The image forming apparatus according to claim 8, wherein said first interface carries out near field wireless communication of 10 cm or less in distance between itself and the portable terminal.

10. The image forming apparatus according to claim 9, wherein said second interface establishes connection with the portable terminal through said first interface and then carries out transmission and reception of a wireless signal between itself and the portable terminal.

11. The image forming apparatus according to claim 8, wherein when said discrimination processor discriminates that the set value is not capable of being set, said controller causes said display of the portable terminal to display a message that the set value is not capable of being set and an icon confirming that a user accepts the message, and then in response to selection of the icon by the user, said controller causes said display of the portable terminal to display a printing condition based on another set value settable by the image forming apparatus instead of the set value.

12. The image forming apparatus according to claim 8, wherein when said discrimination processor discriminates that the set value is not capable of being set, said controller causes said display of the portable terminal to display an icon for providing an instruction to cause said image forming assembly to form the image under a printing condition based on another set value settable by the image forming apparatus instead of the set value.

13. The image forming apparatus according to claim 8, wherein the printing condition depending on the set value is that a color image is printed, and the printing condition based on said another set value is that a monochromatic image is printed.

14. The image forming apparatus according to claim 8, wherein when a number of total pages of printing under the printing condition portion depending on the set value exceeds a preset threshold set for the image forming apparatus, said controller causes said display of the portable terminal to display a message that the number of total pages exceeds the preset threshold and causes said display of the portable terminal to display, as the printing condition based on said another set value, a screen for causing a user to select whether or not images on a plurality of pages are printed on a single sheet by double side printing or reduced size printing.

* * * * *